(12) United States Patent
Wang et al.

(10) Patent No.: US 12,235,415 B2
(45) Date of Patent: Feb. 25, 2025

(54) OPTICAL IMAGING LENS GROUP

(71) Applicant: ZHEJIANG SUNNY OPTICS CO., LTD., Yuyao (CN)

(72) Inventors: Xiaofang Wang, Yuyao (CN); Xiaobin Zhang, Yuyao (CN); Jianke Wenren, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 582 days.

(21) Appl. No.: 17/646,373

(22) Filed: Dec. 29, 2021

(65) Prior Publication Data
US 2022/0244503 A1 Aug. 4, 2022

(30) Foreign Application Priority Data

Feb. 2, 2021 (CN) .......................... 202110140703.4

(51) Int. Cl.
G02B 9/64 (2006.01)
G02B 13/00 (2006.01)
G02B 27/00 (2006.01)

(52) U.S. Cl.
CPC ........... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 13/18
See application file for complete search history.

(56) References Cited

U.S. PATENT DOCUMENTS 4,152,050 A * 5/1979 Fujii ...................... G02B 13/00
359/720

FOREIGN PATENT DOCUMENTS

| CN | 107678140 A | 2/2018 |
| CN | 209471294 U * | 10/2019 ......... G02B 13/0045 |
| WO | WO-2019233160 A1 * | 12/2019 ......... G02B 13/0045 |

OTHER PUBLICATIONS

Gross, VCH Verlag GmbH & Co. KGaA, vol. 3, pp. 378-379 (Year: 2007).*

* cited by examiner

Primary Examiner — Marin Pichler
Assistant Examiner — Mackenzi Waddell
(74) Attorney, Agent, or Firm — Sughrue Mion, PLLC

(57) ABSTRACT

The present disclosure discloses an optical imaging lens group. The optical imaging lens group comprises, sequentially along an optical axis from an object side to an image side, a first lens, a second lens, a third lens, a fourth lens, a fifth lens, a sixth lens, a seventh lens and an eighth lens, wherein the first lens, the second lens, the third lens, the fourth lens, the fifth lens, the sixth lens, the seventh lens and the eighth lens have refractive powers. At least one lens in the first lens to the eighth lens has a non-rotationally symmetric aspheric surface; a total effective focal length fy of the optical imaging lens group in a Y-axis direction and a total effective focal length fx of the optical imaging lens group in an X-axis direction satisfy: fy/fx<0.8; and an f-number Fnoy of the optical imaging lens group in the Y-axis direction satisfies: Fnoy<2.9.

19 Claims, 7 Drawing Sheets

OPTICAL IMAGING LENS GROUP

CROSS-REFERENCE TO RELATED APPLICATIONS

This application claims the priority from Chinese Patent Application No. 202110140703.4, filed in the National Intellectual Property Administration (CNIPA) on Feb. 2, 2021, the contents of which are hereby incorporated by reference in their entirety.

TECHNICAL FIELD

The present disclosure relates to the field of optical element, and specifically to an optical imaging lens group.

BACKGROUND

In recent years, with the vigorous development of portable electronic products such as smart phones, major smart phone manufacturers and other manufacturers have gradually begun to study how to improve the photographing effects of the smart phones, in order to improve the competitiveness of their products. At present, the aspect ratio of the lens assemblies of most mobile phones on the market is 16:9, which however cannot meet the needs of users for a picture of a wide aspect ratio.

Generally, in order to obtain the picture of the wide aspect ratio, it is required to crop a photo later. However, the cropping would destroy the composition and pixels of the original photo. In addition, in order to generate an original picture of a wide aspect ratio, it is required to apply a freeform surface first to compress the length of the picture, and then it is required to expand the picture through later stretching. Specifically, a smart phone is required to be externally connected with an anamorphic lens assembly to achieve this effect. However, if a mobile phone is externally connected with an anamorphic lens assembly, on the one hand, the anamorphic lens assembly is required to be precisely connected with the lens assembly of the mobile phone, and on the other hand, a special application program is further required to be downloaded to generate a picture of a wide aspect ratio. However, since the precision of the connection is high and the application program is further required to be added, the popularization of the technology of achieving the picture of the wide aspect ratio is restricted to some extent.

SUMMARY

An aspect of the present disclosure is to provide an optical imaging lens group, comprising, sequentially along an optical axis from an object side to an image side: a first lens, a second lens, a third lens, a fourth lens, a fifth lens, a sixth lens, a seventh lens and an eighth lens, wherein the first lens, the second lens, the third lens, the fourth lens, the fifth lens, the sixth lens, the seventh lens and the eighth lens have refractive powers, wherein at least one lens in the first lens to the eighth lens has a non-rotationally symmetric aspheric surface; a total effective focal length fy of the optical imaging lens group in a Y-axis direction and a total effective focal length fx of the optical imaging lens group in an X-axis direction may satisfy: $fy/fx<0.8$; and an f-number Fnoy of the optical imaging lens group in the Y-axis direction may satisfy: $Fnoy<2.9$.

In the exemplary implementations, at least one of the surfaces from the object-side surface of the first lens to the image-side surface of the eighth lens is an aspheric surface.

In the exemplary implementations, an f-number Fnox of the optical imaging lens group in the X-axis direction may satisfy: $Fnox<3.0$.

In the exemplary implementations, an effective focal length f1y of the first lens in the Y-axis direction of the optical imaging lens group, an effective focal length f8y of the eighth lens in the Y-axis direction of the optical imaging lens group and an effective focal length f8x of the eighth lens in the X-axis direction of the optical imaging lens group may satisfy: $0.5<(f8x+f8y)/f1y<1.5$.

In the exemplary implementations, an effective focal length f4 of the fourth lens in the Y-axis direction of the optical imaging lens group, an effective focal length f5 of the fifth lens in the Y-axis direction of the optical imaging lens group and an effective focal length f7 of the seventh lens in the Y-axis direction of the optical imaging lens group may satisfy: $-1.5<(f4+f7)/f5<-0.5$.

In the exemplary implementations, an effective focal length f3y of the third lens in the Y-axis direction of the optical imaging lens group and an effective focal length f3x of the third lens in the X-axis direction of the optical imaging lens group may satisfy: $0.5<f3y/(f3y+f3x)<2.0$.

In the exemplary implementations, a radius of curvature R1 of an object-side surface of the first lens, a radius of curvature R2 of an image-side surface of the first lens, a radius of curvature R5 of an object-side surface of the third lens and a radius of curvature R6 of an image-side surface of the third lens may satisfy: $0<(R5+R6)/(R1+R2)<1.0$.

In the exemplary implementations, a radius of curvature R7 of an object-side surface of the fourth lens, a radius of curvature R8 of an image-side surface of the fourth lens, a radius of curvature R9 of an object-side surface of the fifth lens and a radius of curvature R10 of an image-side surface of the fifth lens may satisfy: $0<(R9+R10)/(R7-R8)<1.0$.

In the exemplary implementations, a radius of curvature R14 of an image-side surface of the seventh lens, a radius of curvature R15 of an object-side surface of the eighth lens and a radius of curvature R16 of an image-side surface of the eighth lens may satisfy: $0.2<R14/(R16-R15)<1.0$.

In the exemplary implementations, a maximal effective radius DT21 of an object-side surface of the second lens and a maximal effective radius DT81 of an object-side surface of the eighth lens may satisfy: $0.5<DT21/DT81<1.0$.

In the exemplary implementations, an edge thickness ET5 of the fifth lens and an edge thickness ET6 of the sixth lens may satisfy: $0.3<ET6/ET5<0.8$.

In the exemplary implementations, a maximal effective radius DT32 of an image-side surface of the third lens and a maximal effective radius DT52 of an image-side surface of the fifth lens may satisfy: $0.5<DT52/DT32<1.0$.

In the exemplary implementations, a center thickness CT2 of the second lens on the optical axis, a center thickness CT3 of the third lens on the optical axis, a center thickness CT4 of the fourth lens on the optical axis and a center thickness CT5 of the fifth lens on the optical axis may satisfy: $1.3<(CT2+CT3)/(CT4+CT5)<2.0$.

In the exemplary implementations, a center thickness CT6 of the sixth lens on the optical axis, a center thickness CT7 of the seventh lens on the optical axis and a center thickness CT8 of the eighth lens on the optical axis may satisfy: $0.3<CT7/(CT6+CT8)<0.8$.

In the exemplary implementations, the fifth lens has a negative refractive power.

In the exemplary implementations, the seventh lens has a positive refractive power, and an image-side surface of the seventh lens is a convex surface.

In the exemplary implementations, the eighth lens has a negative refractive power, an object-side surface of the eighth lens is a concave surface, and an image-side surface of the eighth lens is a convex surface at an area close to the optical axis in the Y-axis direction of the optical imaging lens group.

In the exemplary implementations, a maximal field-of-view FOV of the optical imaging lens group in a direction of a bisector of an angle between the Y-axis direction and the X-axis direction may satisfy: FOV>80°.

In the exemplary implementations, the f-number Fnoy of the optical imaging lens group in the Y-axis direction and an f-number Fnox of the optical imaging lens group in the X-axis direction may satisfy: Fnox/Fnoy≥1.1.

Another aspect of the present disclosure is to provide an optical imaging lens group, comprising, sequentially along an optical axis from an object side to an image side: a first lens, a second lens, a third lens, a fourth lens, a fifth lens, a sixth lens, a seventh lens and an eighth lens, wherein the first lens, the second lens, the third lens, the fourth lens, the fifth lens, the sixth lens, the seventh lens and the eighth lens have refractive powers, wherein at least one lens in the first lens to the eighth lens has a non-rotationally symmetric aspheric surface; an effective focal length f3y of the third lens in a Y-axis direction of the optical imaging lens group and an effective focal length f3x of the third lens in an X-axis direction of the optical imaging lens group may satisfy: 0.5<f3y/(f3y+f3x)<2.0; and an f-number Fnoy of the optical imaging lens group in the Y-axis direction may satisfy: Fnoy<2.9.

In the exemplary implementations, an f-number Fnox of the optical imaging lens group in the X-axis direction may satisfy: Fnox<3.0.

In the exemplary implementations, an effective focal length f1y of the first lens in the Y-axis direction of the optical imaging lens group, an effective focal length f8y of the eighth lens in the Y-axis direction of the optical imaging lens group and an effective focal length f8x of the eighth lens in the X-axis direction of the optical imaging lens group may satisfy: 0.5<(f8x+f8y)/f1y<1.5.

In the exemplary implementations, an effective focal length f4 of the fourth lens in the Y-axis direction of the optical imaging lens group, an effective focal length f5 of the fifth lens in the Y-axis direction of the optical imaging lens group and an effective focal length f7 of the seventh lens in the Y-axis direction of the optical imaging lens group may satisfy: −1.5<(f4+f7)/f5<−0.5.

In the exemplary implementations, a radius of curvature R1 of an object-side surface of the first lens, a radius of curvature R2 of an image-side surface of the first lens, a radius of curvature R5 of an object-side surface of the third lens and a radius of curvature R6 of an image-side surface of the third lens may satisfy: 0<(R5+R6)/(R1+R2)<1.0.

In the exemplary implementations, a radius of curvature R7 of an object-side surface of the fourth lens, a radius of curvature R8 of an image-side surface of the fourth lens, a radius of curvature R9 of an object-side surface of the fifth lens and a radius of curvature R10 of an image-side surface of the fifth lens may satisfy: 0<(R9+R10)/(R7−R8)<1.0.

In the exemplary implementations, a radius of curvature R14 of an image-side surface of the seventh lens, a radius of curvature R15 of an object-side surface of the eighth lens and a radius of curvature R16 of an image-side surface of the eighth lens may satisfy: 0.2<R14/(R16−R15)<1.0.

In the exemplary implementations, a maximal effective radius DT21 of an object-side surface of the second lens and a maximal effective radius DT81 of the object-side surface of the eighth lens may satisfy: 0.5<DT21/DT81<1.0.

In the exemplary implementations, an edge thickness ET5 of the fifth lens and an edge thickness ET6 of the sixth lens may satisfy: 0.3<ET6/ET5<0.8.

In the exemplary implementations, a maximal effective radius DT32 of an image-side surface of the third lens and a maximal effective radius DT52 of an image-side surface of the fifth lens may satisfy: 0.5<DT52/DT32<1.0.

In the exemplary implementations, a center thickness CT2 of the second lens on the optical axis, a center thickness CT3 of the third lens on the optical axis, a center thickness CT4 of the fourth lens on the optical axis and a center thickness CT5 of the fifth lens on the optical axis may satisfy: 1.3<(CT2+CT3)/(CT4+CT5)<2.0.

In the exemplary implementations, a center thickness CT6 of the sixth lens on the optical axis, a center thickness CT7 of the seventh lens on the optical axis and a center thickness CT8 of the eighth lens on the optical axis may satisfy: 0.3<CT7/(CT6+CT8)<0.8.

In the exemplary implementations, the fifth lens has a negative refractive power.

In the exemplary implementations, the seventh lens has a positive refractive power, and an image-side surface of the seventh lens is a convex surface.

In the exemplary implementations, the eighth lens has a negative refractive power, an object-side surface of the eighth lens is a concave surface, and an image-side surface of the eighth lens is a convex surface at an area close to the optical axis in the Y-axis direction of the optical imaging lens group.

In the exemplary implementations, a maximal field-of-view FOV of the optical imaging lens group in a direction of a bisector of an angle between the Y-axis direction and the X-axis direction may satisfy: FOV>80°.

In the exemplary implementations, the f-number Fnoy of the optical imaging lens group in the Y-axis direction and an f-number Fnox of the optical imaging lens group in the X-axis direction may satisfy: Fnox/Fnoy≥1.1.

In the exemplary implementations, a total effective focal length fy of the optical imaging lens group in the Y-axis direction and a total effective focal length fx of the optical imaging lens group in the X-axis direction may satisfy: fy/fx<0.8.

According to the present disclosure, by reasonably distributing the refractive powers and optimizing the optical parameters, an optical imaging lens group applicable to portable electronic products and having at least one of the characteristics such as a wide aspect ratio, miniaturization and a good imaging quality is provided.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

Figure 1:
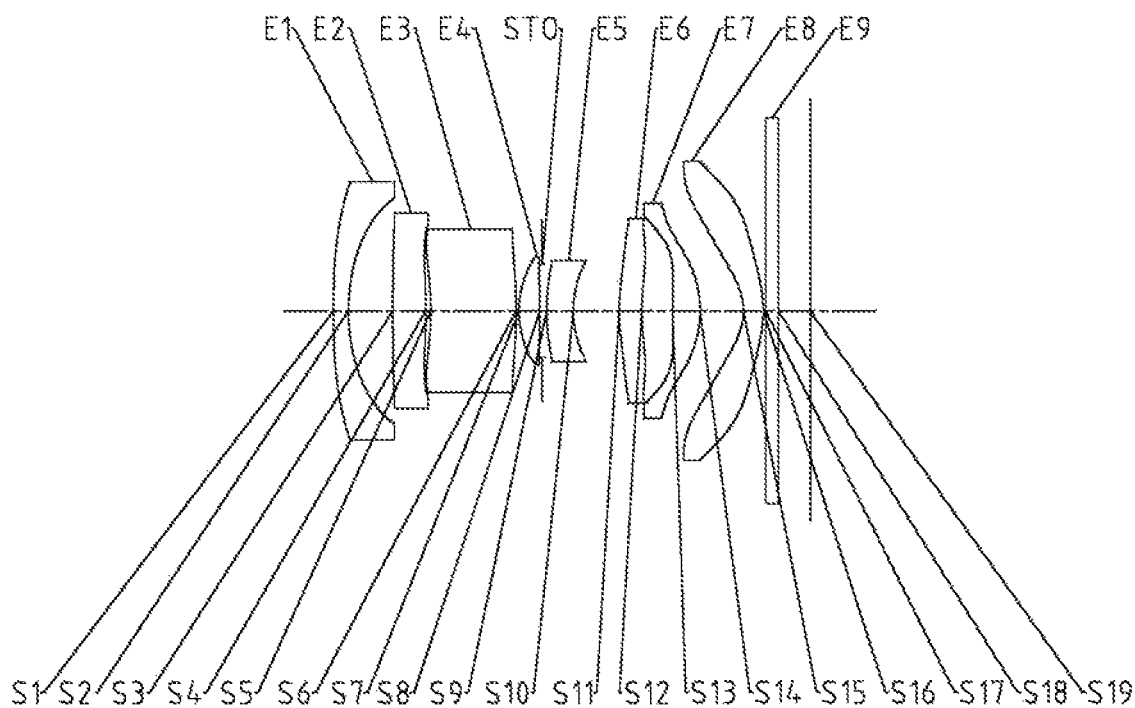
FIG. 1 is a schematic structural diagram of an optical imaging lens group according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image plane is referred to as the image-side surface of the lens.

Herein, a direction parallel to the optical axis is defined as a Z-axis direction, a direction being in a tangential plane and perpendicular to the Z-axis is defined as a Y-axis direction, and a direction being in a sagittal plane and perpendicular to the Z-axis is defined as an X-axis direction. Unless otherwise stated, except for the parameter symbol relating to a field of view, the parameter symbol (e.g., a refractive power) herein represents a parameter value of a feature along the Y-axis direction of the optical imaging lens group. For example, if there is no specific description, fx represents the total effective focal length of the optical imaging lens group in the X-axis direction, fy represents the total effective focal length of the optical imaging lens group in the Y-axis direction, f4 represents the effective focal length of the fourth lens in the Y-axis direction of the optical imaging lens group, and the like.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical imaging lens group according to exemplary implementations of the present disclosure may include eight lenses having refractive powers, which are respectively a first lens, a second lens, a third lens, a fourth lens, a fifth lens, a sixth lens, a seventh lens and an eighth lens. The eight lenses are arranged in sequence along an optical axis from an object side to an image side. Any two adjacent lenses in the first to eighth lenses may have a spacing distance.

According to the exemplary implementations of the present disclosure, each of the first lens, the second lens, the third lens, the fourth lens, the fifth lens, the sixth lens, the seventh lens and the eighth lens may have a positive refractive power or a negative refractive power.

In the exemplary implementations, at least one lens in the first lens to the eighth lens has a non-rotationally symmetric aspheric surface. By setting a non-rotationally symmetric aspheric surface in the optical imaging lens group, it is possible that the optical imaging lens group has different magnifications in different directions (e.g., a Y-axis direction and an X-axis direction), thereby achieving the imaging effect of a wide aspect ratio.

In the exemplary implementations, the optical imaging lens group according to the present disclosure may satisfy: fy/fx<0.8. Here, fy is a total effective focal length of the optical imaging lens group in the Y-axis direction, and fx is a total effective focal length of the optical imaging lens group in the X-axis direction. By satisfying fy/fx<0.8, it is possible that the optical imaging lens group has different magnifications in the Y-axis direction and the X-axis direction, thereby achieving the imaging effect of a wide aspect ratio.

In the exemplary implementations, the optical imaging lens group according to the present disclosure may satisfy: Fnoy<2.9. Here, Fnoy is an f-number of the optical imaging lens group in the Y-axis direction. More specifically, Fnoy may further satisfy: Fnoy<2.7. By satisfying Fnoy<2.9, the size of the entrance pupil in the Y-axis direction can be effectively controlled, and thus, the amount of light entering the optical imaging lens group can be ensured.

In the exemplary implementations, the optical imaging lens group according to the present disclosure may satisfy: Fnox-fx/fy<1.7. Here, Fnox is an f-number of the optical imaging lens group in the X-axis direction, fy is the total effective focal length of the optical imaging lens group in the Y-axis direction, and fx is the total effective focal length of the optical imaging lens group in the X-axis direction. By satisfying Fnox-fx/fy<1.7, the high-order aberration of the optical imaging lens group can be effectively reduced, thereby ensuring that the optical imaging lens group has a good imaging quality.

In the exemplary implementations, the optical imaging lens group according to the present disclosure may satisfy: Fnox<3.0. Here, Fnox is the f-number of the optical imaging lens group in the X-axis direction. By satisfying Fnox<3.0, the size of the entrance pupil in the X-axis direction can be effectively controlled, and thus, the amount of light entering the optical imaging lens group can be ensured.

In the exemplary implementations, the optical imaging lens group according to the present disclosure may satisfy: Fnoy/fy<0.9. Here, Fnoy is the f-number of the optical imaging lens group in the Y-axis direction, and fy is the total effective focal length of the optical imaging lens group in the Y-axis direction. By satisfying Fnoy/fy<0.9, the size of the entrance pupil in the Y-axis direction can be effectively controlled, and thus, the amount of light entering the optical imaging lens group in the Y-axis direction can be ensured.

In the exemplary implementations, the optical imaging lens group according to the present disclosure may satisfy: 0.5<(f8x+f8y)/f1y<1.5. Here, f1y is an effective focal length of the first lens in the Y-axis direction of the optical imaging lens group, f8y is an effective focal length of the eighth lens in the Y-axis direction of the optical imaging lens group, and f8x is an effective focal length of the eighth lens in the X-axis direction of the optical imaging lens group. More specifically, f8x, f8y and f1y may further satisfy: 0.6<(f8x+f8y)/f1y<1.0. By satisfying 0.5<(f8x+f8y)/f1y<1.5, the amount of spherical aberration that the first lens and the eighth lens contribute to the optical imaging lens group can be effectively controlled, such that the optical imaging lens group obtains a good imaging quality in a field of view.

In the exemplary implementations, the optical imaging lens group according to the present disclosure may satisfy: −1.5<(f4+f7)/f5<−0.5. Here, f4 is an effective focal length of the fourth lens in the Y-axis direction of the optical imaging lens group, f5 is an effective focal length of the fifth lens in the Y-axis direction of the optical imaging lens group, and f7 is an effective focal length of the seventh lens in the Y-axis direction of the optical imaging lens group. More specifically, f4, f7, and f5 may further satisfy: −1.3<(f4+f7)/f5<−0.8. By satisfying −1.5<(f4+f7)/f5<−0.5, the amount of high-order aberration that the fourth lens, the fifth lens and the seventh lens contribute to the optical imaging lens group can be effectively controlled, thereby ensuring that the optical imaging lens group has a good imaging quality.

In the exemplary implementations, the optical imaging lens group according to the present disclosure may satisfy: 0.5<f3y/(f3y+f3x)<2.0. Here, f3y is an effective focal length of the third lens in the Y-axis direction of the optical imaging lens group, and f3x is an effective focal length of the third lens in the X-axis direction of the optical imaging lens group. More specifically, f3y and f3x may further satisfy: 0.5<f3y/(f3y+f3x)<1.7. By satisfying 0.5<f3y/(f3y+f3x)<2.0, the shape of the third lens can be effectively controlled, such that the third lens has different focal lengths in the X-axis direction and the Y-axis direction, which enhances the asymmetry of the optical imaging lens group, and thus, it can be ensured that the optical imaging lens group has the imaging effect of a wider aspect ratio.

In the exemplary implementations, the optical imaging lens group according to the present disclosure may satisfy: −1.0<f3x/|f3y|<0. Here, f3y is the effective focal length of the third lens in the Y-axis direction of the optical imaging lens group, and f3x is the effective focal length of the third lens in the X-axis direction of the optical imaging lens group. By satisfying −1.0<f3x/|f3y|<0, it is possible to effectively control the shape of the third lens, which ensures the processability of the third lens, and it is also possible that the third lens has different focal lengths in the X-axis direction and the Y-axis direction, which enhances the asymmetry of the optical imaging lens group. Thus, it can be ensured that the optical imaging lens group has the imaging effect of a wider aspect ratio.

In the exemplary implementations, the optical imaging lens group according to the present disclosure may satisfy: 0<(R5+R6)/(R1+R2)<1.0. Here, R1 is a radius of curvature of an object-side surface of the first lens, R2 is a radius of curvature of an image-side surface of the first lens, R5 is a radius of curvature of an object-side surface of the third lens, and R6 is a radius of curvature of an image-side surface of the third lens. More specifically, R5, R6, R1 and R2 may further satisfy: 0.1<(R5+R6)/(R1+R2)<0.8. By satisfying 0<(R5+R6)/(R1+R2)<1.0, the shapes of the first lens and the third lens can be effectively controlled, and thus, the angles of refraction of a light beam in the first lens and the third lens can be controlled. Accordingly, it is possible that the optical imaging lens group has a good processability, and the optical imaging lens group can better match a chip.

In the exemplary implementations, the optical imaging lens group according to the present disclosure may satisfy: 0<(R9+R10)/(R7−R8)<1.0. Here, R7 is a radius of curvature of an object-side surface of the fourth lens, R8 is a radius of curvature of an image-side surface of the fourth lens, R9 is a radius of curvature of an object-side surface of the fifth lens, and R10 is a radius of curvature of an image-side surface of the fifth lens. More specifically, R9, R10, R7 and R8 may further satisfy: $0.2<(R9+R10)/(R7-R8)<0.6$. By satisfying $0<(R9+R10)/(R7-R8)<1.0$, the shapes of the fourth lens and the fifth lens can be effectively controlled, which is conducive to converging light and controlling the direction of the light, such that the optical imaging lens group has a better processability.

In the exemplary implementations, the optical imaging lens group according to the present disclosure may satisfy: $0.2<R14/(R16-R15)<1.0$. Here, R14 is a radius of curvature of an image-side surface of the seventh lens, R15 is a radius of curvature of an object-side surface of the eighth lens, and R16 is a radius of curvature of an image-side surface of the eighth lens. More specifically, R14, R16 and R15 may further satisfy: $0.3<R14/(R16-R15)<0.7$. By satisfying $0.2<R14/(R16-R15)<1.0$, the shapes of the seventh lens and the eighth lens can be effectively controlled, and thus, the angles of refraction of light in the seventh lens and the eighth lens are controlled. Accordingly, the angle of emergence of light after passing through the optical imaging lens group can be better matched with the chip.

In the exemplary implementations, the optical imaging lens group according to the present disclosure may satisfy: $0.5<DT21/DT81<1.0$. Here, DT21 is a maximal effective radius of an object-side surface of the second lens, and DT81 is a maximal effective radius of the object-side surface of the eighth lens. More specifically, DT21 and DT81 may further satisfy: $0.6<DT21/DT81<0.9$. By satisfying $0.5<DT21/DT81<1.0$, the height of edge light can be effectively controlled, which is conducive to reducing the difference between the aperture of a front lens (the second lens) and the aperture of a rear lens (the eighth lens), and which is more conducive to the structure design of the optical imaging lens group.

In the exemplary implementations, the optical imaging lens group according to the present disclosure may satisfy: $0.3<ET6/ET5<0.8$. Here, ET5 is an edge thickness of the fifth lens, and ET6 is an edge thickness of the sixth lens. By satisfying $0.3<ET6/ET5<0.8$, the shapes of the fifth lens and the sixth lens can be effectively controlled, and thus, the processability of the fifth lens and the sixth lens is ensured, which is conducive to the molding of the fifth lens and the sixth lens. At the same time, the direction of the edge light can also be effectively controlled, thereby ensuring the imaging quality of the edge field of view.

In the exemplary implementations, the optical imaging lens group according to the present disclosure may satisfy: $0.5<DT52/DT32<1.0$. Here, DT32 is a maximal effective radius of the image-side surface of the third lens, and DT52 is a maximal effective radius of the image-side surface of the fifth lens. More specifically, DT52 and DT32 may further satisfy: $0.7<DT52/DT32<1.0$. By satisfying $0.5<DT52/DT32<1.0$, the shapes of the third lens and the fifth lens can be effectively controlled, the direction of light can be effectively controlled, which is conducive to the structural design of the third lens and the fifth lens. Moreover, the difference value between the aperture of the third lens and the aperture of the fifth lens can also be effectively controlled.

In the exemplary implementations, the optical imaging lens group according to the present disclosure may satisfy: $1.3<(CT2+CT3)/(CT4+CT5)<2.0$. Here, CT2 is a center thickness of the second lens on the optical axis, CT3 is a center thickness of the third lens on the optical axis, CT4 is a center thickness of the fourth lens on the optical axis, and CT5 is a center thickness of the fifth lens on the optical axis. By satisfying $1.3<(CT2+CT3)/(CT4+CT5)<2.0$, the amount of field curvature that the second to fifth lenses contribute to the optical imaging lens group can be effectively controlled, thereby ensuring that the optical imaging lens group has a good imaging quality.

In the exemplary implementations, the optical imaging lens group according to the present disclosure may satisfy: $0.3<CT7/(CT6+CT8)<0.8$. Here, CT6 is a center thickness of the sixth lens on the optical axis, CT7 is a center thickness of the seventh lens on the optical axis, and CT8 is a center thickness of the eighth lens on the optical axis. More specifically, CT7, CT6 and CT8 may further satisfy: $0.4<CT7/(CT6+CT8)<0.8$. By satisfying $0.3<CT7/(CT6+CT8)<0.8$, the processability of the sixth to eighth lenses can be ensured, and the influence of a rear lens (e.g., the sixth to eighth lenses) on the field curvature of the optical imaging lens group can be effectively controlled, such that the optical imaging lens group has a good imaging quality.

In the exemplary implementations, the fifth lens may have a negative refractive power. By controlling the refractive power of the fifth lens, the shape of the fifth lens can be effectively controlled, and thus, the amount of spherical aberration that the fifth lens contributes to the optical imaging lens group can be controlled, such that the fifth lens has a good imaging quality in a paraxial field of view.

In the exemplary implementations, the seventh lens may have a positive refractive power, and the image-side surface of the seventh lens may be a convex surface. By controlling the refractive power of the seventh lens, the shape of the seventh lens can be effectively controlled, and thus, the amount of spherical aberration that the seventh lens contributes to the optical imaging lens group can be controlled, such that the seventh lens has a good imaging quality in a paraxial field of view. By setting the image-side surface of the seventh lens to the convex surface, the direction of light can be effectively controlled, which is advantageous in that the optical imaging lens group can better match the chip.

In the exemplary implementations, the eighth lens may have a negative refractive power, the object-side surface of the eighth lens may be a concave surface, and the image-side surface of the eighth lens may be a convex surface at an area close to the optical axis in the Y-axis direction of the optical imaging lens group. By reasonably controlling the refractive power and surface characteristics of the eighth lens, the shape of the eighth lens can be effectively controlled, and thus, the amount of spherical aberration that the eighth lens contributes to the optical imaging lens group can be controlled. At the same time, the direction of light can also be effectively controlled, such that the optical imaging lens group can better match the chip.

In the exemplary implementations, the optical imaging lens group according to the present disclosure may satisfy: $FOV>80°$. Here, FOV is a maximal field-of-view of the optical imaging lens group in a direction of a bisector of an angle between the Y-axis direction and the X-axis direction. More specifically, FOV may further satisfy: $FOV>85°$. Satisfying $FOV>80°$ is conducive to expanding the imageable field of the optical imaging lens group, such that the optical imaging lens group has a large field of view.

In the exemplary implementations, the optical imaging lens group according to the present disclosure may satisfy: $Fnox/Fnoy \geq 1.1$. Here, Fnoy is the f-number of the optical imaging lens group in the Y-axis direction, and Fnox is the f-number of the optical imaging lens group in the X-axis direction. By satisfying Fnox/Fnoy≥1.1, the entrance pupil diameter of the optical imaging lens group can be effectively controlled, which ensures the amount of light entering the optical imaging lens group, and ensures that the entrance pupil diameters of the optical imaging lens group in the Y-axis direction and the X-axis direction are approximate.

In the exemplary implementations, the optical imaging lens group according to the present disclosure further includes a diaphragm disposed between the fourth lens and the fifth lens. Alternatively, the above optical imaging lens group may further include an optical filter for correcting color deviations and/or a protective glass for protecting a photosensitive element on an image plane. The present disclosure proposes an optical imaging lens group having characteristics such as a wide aspect ratio, high pixels and miniaturization and adopting an aspheric surface and a freeform surface. The optical imaging lens group according to the above implementations of the present disclosure may use a plurality of lenses, for example, the above eight lenses. By reasonably distributing the refractive powers and the surface types of the lenses, the center thicknesses of the lenses, the axial spacings between the lenses, etc., it is possible to effectively reduce the size of the optical imaging lens group and improve the processability of the optical imaging lens group, which is more conducive to the production and processing of the optical imaging lens group.

In the implementations of the present disclosure, at least one of the surfaces of the lenses is an aspheric surface. That is, at least one of the surfaces from the object-side surface of the first lens to the image-side surface of the eighth lens is an aspheric surface.

The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens, the seventh lens and the eighth lens is an aspheric surface. Alternatively, both of the object-side surface and the image-side surface of each of the first lens, the second lens, the third lens, the fourth lens, the fifth lens, the sixth lens, the seventh lens and the eighth lens are aspheric surfaces.

However, it should be understood by those skilled in the art that the various results and advantages described in the present specification may be obtained by changing the number of the lenses constituting the optical imaging lens group without departing from the technical solution claimed by the present disclosure. For example, although the optical imaging lens group having eight lenses is described as an example in the implementations, the optical imaging lens group is not limited to the eight lenses. If desired, the optical imaging lens group may also include other numbers of lenses.

Specific embodiments of the optical imaging lens group that may be applied to the above implementations are further described below with reference to the accompanying drawings.

Embodiment 1

An optical imaging lens group according to Embodiment 1 of the present disclosure is described below with reference to FIGS. 1 and 2. FIG. 1 is a schematic structural diagram of the optical imaging lens group according to Embodiment 1 of the present disclosure.

As shown in FIG. 1, the optical imaging lens group includes, sequentially from an object side to an image side, a first lens E1, a second lens E2, a third lens E3, a fourth lens E4, a diaphragm STO, a fifth lens E5, a sixth lens E6, a seventh lens E7, an eighth lens E8, an optical filter E9 and an image plane S19.

The first lens E1 has a negative refractive power in a Y-axis direction of the optical imaging lens group and a negative refractive power in an X-axis direction of the optical imaging lens group. An object-side surface S1 of the first lens E1 is a convex surface, and an image-side surface S2 of the first lens E1 is a concave surface. The second lens E2 has a positive refractive power in the Y-axis direction of the optical imaging lens group and a positive refractive power in the X-axis direction of the optical imaging lens group. An object-side surface S3 of the second lens E2 is a convex surface, and an image-side surface S4 of the second lens E2 is a concave surface. The third lens E3 has a negative refractive power in the Y-axis direction of the optical imaging lens group and a negative refractive power in the X-axis direction of the optical imaging lens group. An object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power in the Y-axis direction of the optical imaging lens group and a negative refractive power in the X-axis direction of the optical imaging lens group. An object-side surface S15 of the eighth lens E8 is a concave surface, and an image-side surface S16 of the eighth lens E8 is a convex surface. The optical filter E9 has an object-side surface S17 and an image-side surface S18. Light from an object sequentially passes through the surfaces S1-S18 and finally forms an image on the image plane S19.

Table 1 is a table showing basic parameters of the optical imaging lens group in Embodiment 1. Here, the units of a radius of curvature, a thickness/distance, a focal length Y and a focal length X are millimeters (mm).

TABLE 1

| surface number | surface type | radius of curvature | thickness/ distance | material refractive index | abbe number | focal length Y | focal length X | conic coefficient |
|---|---|---|---|---|---|---|---|---|
| OBJ | spherical | infinite | infinite | | | | | |
| S1(AAS) | aspheric | 15.795 | 0.2500 | 1.55 | 56.1 | −7.22 | −35.35 | −2.2146 |
| S2(AAS) | aspheric | 1.8478 | 0.7356 | | | | | −0.4776 |
| S3(AAS) | aspheric | 18.1104 | 0.5497 | 1.67 | 19.2 | 11.15 | 43.70 | 94.5939 |
| S4(AAS) | aspheric | 20.7949 | 0.5865 | | | | | 99.0000 |
| S5(AAS) | aspheric | 12.6029 | 0.6499 | 1.65 | 23.5 | −16.43 | −13.28 | −99.0000 |
| S6(AAS) | aspheric | 0.542 | 0.1643 | | | | | −0.8711 |
| S7 | aspheric | 1.7067 | 0.3484 | 1.55 | 56.1 | 2.80 | | 0.0000 |
| S8 | aspheric | −13.479 | 0.0400 | | | | | 0.0000 |
| STO | spherical | infinite | 0.0700 | | | | | |
| S9 | aspheric | 3.0219 | 0.4453 | 1.67 | 19.2 | −6.35 | | 0.0000 |
| S10 | aspheric | 1.6693 | 0.7628 | | | | | 0.0000 |
| S11 | aspheric | 3.2217 | 0.3745 | 1.55 | 56.1 | −178.85 | | 0.0000 |
| S12 | aspheric | 2.9908 | 0.5151 | | | | | 0.0000 |
| S13 | aspheric | 7.3990 | 0.4555 | 1.55 | 56.1 | 2.92 | | 0.0000 |
| S14 | aspheric | −1.9914 | 0.7228 | | | | | 0.0000 |
| S15 | aspheric | −0.9531 | 0.3300 | 1.54 | 55.9 | −3.77 | −2.09 | −1.0000 |
| S16(AAS) | aspheric | −5.5072 | 0.0400 | | | | | 0.0000 |
| S17 | spherical | infinite | 0.2100 | 1.52 | 64.2 | | | |
| S18 | spherical | infinite | 0.5295 | | | | | |
| S19 | spherical | infinite | | | | | | |

It should be understood that the "focal length X" not specifically marked (blank) in the above table is consistent with the numerical value of the corresponding "focal length Y." The situation of "focal length X" in the following embodiments is similar to that in this embodiment.

In this example, a total effective focal length fx of the optical imaging lens group in the X-axis direction is 4.20 mm, and a total effective focal length fy of the optical imaging lens group in the Y-axis direction is 3.15 mm. A total track length TTL of the optical imaging lens group (i.e., a distance from the object-side surface S1 of the first lens E1 to the image plane S19 of the optical imaging lens group on an optical axis) is 7.78 mm. Half of a diagonal length ImgH of an effective pixel area on the image plane S19 of the optical imaging lens group is 3.40 mm. A maximal field-of-view FOV of the optical imaging lens group (i.e., a maximal field-of-view of the optical imaging lens group in the direction of a bisector of an angle between the Y-axis direction and the X-axis direction) is 89.9°. An f-number Fnoy of the optical imaging lens group in the Y-axis direction is 2.59, and an f-number Fnox of the optical imaging lens group in the X-axis direction is 2.88.

In Embodiment 1, the object-side surface and the image-side surface of any lens in the fourth to seventh lenses E4-E7 and the object-side surface S15 of the eighth lens E8 are rotationally symmetric aspheric surfaces, and the surface type x of each rotationally symmetric aspheric lens may be defined using, but not limited to, the following formula:

$$x = \frac{ch^2}{1+\sqrt{1-(k+1)c^2h^2}} + \Sigma A_i h^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Tables 2-1 and 2-2 below give the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$ and $A_{28}$ applicable to the rotationally symmetric aspheric surfaces S7-S15 in Embodiment 1.

TABLE 2-1

| surface number | $A_4$ | $A_6$ | $A_8$ | $A_{10}$ | $A_{12}$ | $A_{14}$ | $A_{16}$ |
|---|---|---|---|---|---|---|---|
| S7 | 9.3287E−03 | 5.5917E−03 | 1.1732E−03 | 3.0933E−04 | 8.5482E−05 | 2.4503E−05 | 3.6856E−06 |
| S8 | 2.2899E−03 | 5.1048E−03 | −3.3372E−04 | 2.1985E−04 | −2.7199E−05 | 1.0498E−05 | −2.3908E−07 |
| S9 | −2.4363E−02 | 2.9914E−03 | −7.9003E−04 | 6.9328E−05 | −2.8921E−05 | 1.8686E−06 | −1.2075E−06 |
| S10 | −1.7866E−02 | 3.7907E−03 | −3.0932E−04 | 6.0113E−05 | −1.1001E−05 | −2.8514E−07 | −4.2984E−07 |
| S11 | −2.1737E−01 | 3.5531E−02 | −5.1305E−03 | 4.7326E−04 | −6.0380E−04 | 2.1993E−04 | 1.6874E−05 |
| S12 | −4.5962E−01 | 7.0828E−02 | −1.1721E−03 | 1.6629E−03 | −2.8362E−03 | −3.5234E−04 | −5.8785E−05 |
| S13 | −6.5599E−01 | 3.2506E−02 | 1.0563E−02 | 4.0448E−03 | −6.7614E−04 | −1.8509E−03 | −1.0480E−03 |
| S14 | 3.3866E−01 | 1.4021E−01 | −1.7050E−02 | −5.3400E−03 | 1.7843E−03 | 3.9915E−04 | 1.7943E−04 |
| S15 | 1.8679E+00 | −2.3513E−01 | 6.3701E−02 | −8.4970E−03 | −9.2100E−03 | 5.1199E−03 | −2.0419E−05 |

TABLE 2-2

| surface number | $A_{18}$ | $A_{20}$ | $A_{22}$ | $A_{24}$ | $A_{26}$ | $A_{28}$ |
|---|---|---|---|---|---|---|
| S7 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 | 0.0000E+00 |
| S12 | 7.1977E−05 | 0.0000E+00 | 0.0000E+00 | 0.0000E+00 | 0.0000E+00 | 0.0000E+00 |
| S13 | −3.3587E−04 | −4.5107E−06 | 2.4097E−07 | 0.0000E+00 | 0.0000E+00 | 0.0000E+00 |
| S14 | 1.3249E−04 | 1.7217E−04 | 1.3162E−05 | 1.7500E−06 | 2.8454E−07 | 0.0000E+00 |
| S15 | −6.0603E−04 | 1.4555E−04 | 5.0126E−06 | −4.0827E−07 | −2.2540E−07 | −4.9338E−08 |

In Embodiment 1, the object-side surface and the image-side surface of any lens in the first to third lenses E1-E3 and the image-side surface S16 of the eighth lens E8 are non-rotationally symmetric aspheric surfaces (i.e., AAS surfaces), and the surface type of a non-rotationally symmetric aspheric surface may be defined using, but not limited to, the following formula:

$$x = \frac{cr^2}{1 + \sqrt{1 - (k+1)c^2 r^2}} + \sum_{j=1}^{66} C_{(j+1)} ZP_j, \text{ where} \quad (2)$$

$$r = \sqrt{x^2 + y^2}. \quad (3)$$

Here, z is the sag of the surface parallel to the optical axis direction; c is the curvature of the vertex of the non-rotationally symmetric aspheric surface; k is the conic coefficient; r is the radius value; $ZP_j$ is a j-th Zernike polynomial; and $C_{(j+i)}$ is the coefficient of $ZP_j$. In the list of coefficients of the AAS surfaces in Embodiment 1, the Zernike polynomials $ZP_1$ to $ZP_{66}$ have corresponding SCO coefficients $C_2$ to $C_{67}$, and SCO coefficients that are not given are all 0. Tables 3-1 to 3-3 below give Zernike polynomial coefficients $C_2$, $C_5$, $C_6$, $C_{12}$, $C_{13}$, $C_{14}$, $C_{23}$, $C_{24}$, $C_{25}$, $C_{26}$, $C_{38}$, $C_{39}$, $C_{40}$, $C_{41}$, $C_{42}$, $C_{57}$, $C_{58}$, $C_{59}$, $C_{60}$, $C_{61}$ and $C_{62}$ applicable to the non-rotationally symmetric aspheric surfaces S1-S6 and S16 in Embodiment 1.

TABLE 3-1

| AAS surface | $C_2$ | $C_5$ | $C_6$ | $C_{12}$ | $C_{13}$ | $C_{14}$ | $C_{23}$ |
|---|---|---|---|---|---|---|---|
| S1 | −1.1862E−02 | −1.0970E−01 | 4.9040E−04 | 2.4224E−02 | −6.1568E−03 | 8.3919E−03 | 3.0918E−04 |
| S2 | −3.3639E−01 | −2.6198E−01 | −3.4816E−01 | 2.3353E−02 | −2.1771E−02 | −1.1598E−02 | −4.6434E−03 |
| S3 | −1.2146E−02 | 1.6542E−02 | −1.0233E−02 | −2.2873E−02 | 7.3911E−03 | 2.3773E−03 | −2.1169E−03 |
| S4 | −2.5244E−02 | 1.0953E−02 | −1.3659E−02 | −8.4835E−03 | −1.7809E−02 | 1.2471E−02 | −2.8969E−05 |
| S5 | −3.2439E−01 | 1.9795E−02 | −6.4018E−02 | 4.3376E−03 | −2.0811E−02 | 1.1620E−02 | 1.4047E−03 |
| S6 | −4.5246E−01 | 4.1799E−02 | −6.1715E−01 | 3.6466E−04 | −2.2401E−03 | −3.3461E−02 | 2.8881E−04 |
| S16 | −1.1489E−01 | 1.3582E−01 | −2.0473E−01 | 5.6399E−02 | −1.2923E−01 | −1.4437E−01 | 1.3231E−02 |

TABLE 3-2

| AAS surface | $C_{24}$ | $C_{25}$ | $C_{26}$ | $C_{38}$ | $C_{39}$ | $C_{40}$ | $C_{41}$ |
|---|---|---|---|---|---|---|---|
| S1 | 1.5573E−03 | 2.9430E−03 | −2.3651E−03 | −6.7804E−05 | 8.3817E−05 | 8.7703E−04 | −6.0340E−04 |
| S2 | 4.6144E−03 | −4.6364E−03 | 2.6557E−04 | 5.3777E−04 | −4.7201E−04 | 5.2975E−04 | −4.7610E−04 |
| S3 | 5.0246E−04 | 5.0177E−04 | −1.7142E−03 | −5.6159E−04 | −2.2730E−04 | −1.3623E−03 | 1.7231E−03 |
| S4 | 4.7384E−03 | −4.3053E−03 | 6.0837E−04 | −9.4106E−04 | 1.6489E−04 | 1.6518E−04 | 8.3674E−05 |
| S5 | 3.0743E−03 | −2.3169E−03 | 1.1770E−03 | −2.7366E−04 | 4.5017E−04 | 3.8971E−04 | −5.5393E−05 |
| S6 | 2.5665E−04 | −1.4716E−04 | −3.7107E−03 | 6.1215E−05 | 9.4351E−05 | 6.8671E−05 | −4.5562E−05 |
| S16 | −2.4659E−02 | −1.5521E−02 | −2.7078E−02 | 1.2733E−04 | −5.6440E−03 | −7.3574E−03 | −3.7825E−03 |

TABLE 3-3

| AAS surface | $C_{42}$ | $C_{57}$ | $C_{58}$ | $C_{59}$ | $C_{60}$ | $C_{61}$ | $C_{62}$ |
|---|---|---|---|---|---|---|---|
| S1 | 1.5943E−03 | −4.8049E−04 | 2.7076E−04 | −1.6884E−04 | 4.6128E−04 | −5.0309E−04 | −5.9979E−07 |
| S2 | 1.7911E−04 | −3.3962E−04 | 3.2405E−04 | −3.3965E−04 | 3.2592E−04 | −3.3902E−04 | 8.8302E−05 |
| S3 | −1.9608E−03 | 3.4472E−04 | −2.4665E−04 | −1.5591E−04 | −2.5844E−04 | 7.0016E−05 | 2.1818E−04 |
| S4 | −2.9885E−05 | 1.1859E−04 | −2.4594E−04 | −8.2407E−05 | −1.6204E−05 | −4.2874E−05 | 2.4736E−04 |
| S5 | 4.0361E−04 | −9.8992E−05 | −4.0418E−05 | 2.7928E−06 | 7.4445E−05 | 1.7945E−05 | −6.8482E−05 |
| S6 | −7.6223E−04 | −6.8596E−06 | 2.5520E−05 | 9.0511E−06 | 1.5924E−05 | −1.1341E−05 | −1.1751E−04 |
| S16 | 2.8652E−02 | 6.2199E−04 | −1.8428E−03 | −1.3912E−03 | −1.8912E−03 | 4.3388E−03 | 1.2070E−03 |

Figure 2:
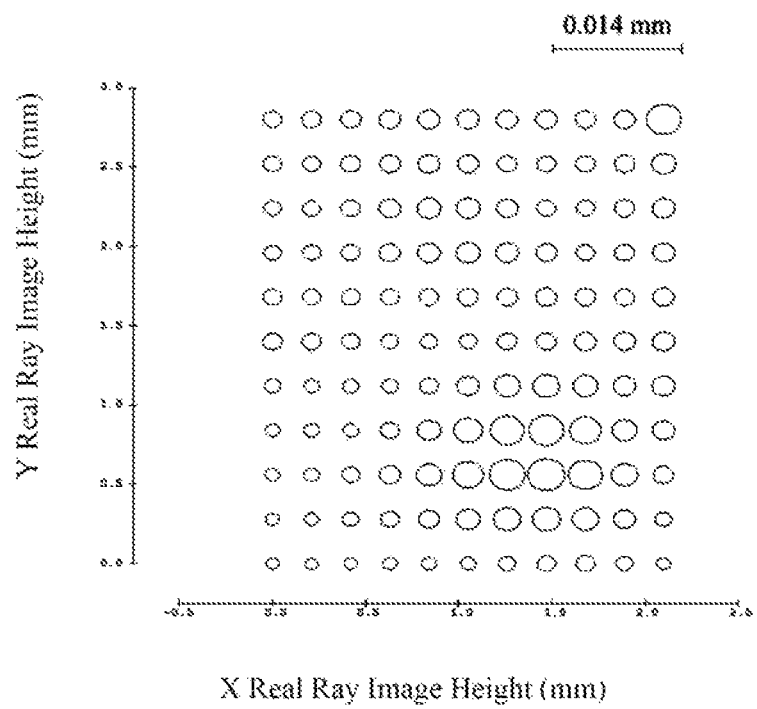
FIG. 2 schematically illustrates a situation of an RMS spot diameter of the optical imaging lens group according to Embodiment 1 of the present disclosure in a first quadrant.

FIG. 2 illustrates a size of an RMS spot diameter of the optical imaging lens group of Embodiment 1 at a different image height in a first quadrant. FIG. 2 illustrates a relationship between the RMS spot diameter and a real ray image height. In FIG. 2, each grid of a coordinate axis corresponds to 0.014 mm, a minimal RMS spot diameter is 0.0016184 mm, a maximal RMS spot diameter is 0.0046882 mm, an average value of RMS spot diameters is 0.0025838 mm, and a standard deviation of the RMS spot diameter is 0.00061168 mm. It can be seen from FIG. 2 that the optical imaging lens group given in Embodiment 1 can achieve a good imaging quality.

Embodiment 2

Figure 3:
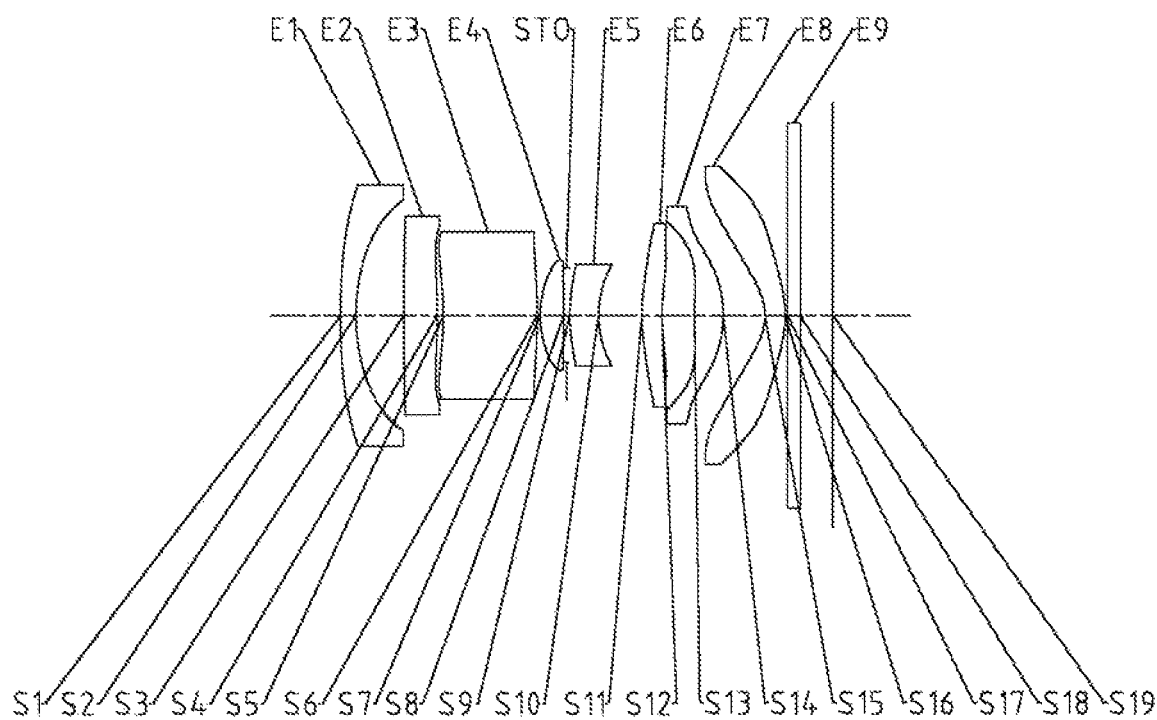
FIG. 3 is a schematic structural diagram of an optical imaging lens group according to Embodiment 2 of the present disclosure.

An optical imaging lens group according to Embodiment 2 of the present disclosure is described below with reference to FIGS. 3 and 4. In this embodiment and the following embodiments, for the sake of brevity, some descriptions similar to those in Embodiment 1 will be omitted. FIG. 3 is a schematic structural diagram of the optical imaging lens group according to Embodiment 2 of the present disclosure.

As shown in FIG. 3, the optical imaging lens group includes, sequentially from an object side to an image side, a first lens E1, a second lens E2, a third lens E3, a fourth lens E4, a diaphragm STO, a fifth lens E5, a sixth lens E6, a seventh lens E7, an eighth lens E8, an optical filter E9 and an image plane S19.

The first lens E1 has a negative refractive power in a Y-axis direction of the optical imaging lens group and a negative refractive power in an X-axis direction of the optical imaging lens group. An object-side surface S1 of the first lens E1 is a convex surface, and an image-side surface S2 of the first lens E1 is a concave surface. The second lens E2 has a positive refractive power in the Y-axis direction of the optical imaging lens group and a positive refractive power in the X-axis direction of the optical imaging lens group. An object-side surface S3 of the second lens E2 is a convex surface, and an image-side surface S4 of the second lens E2 is a concave surface. The third lens E3 has a negative refractive power in the Y-axis direction of the optical imaging lens group and a negative refractive power in the X-axis direction of the optical imaging lens group. An object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power in the Y-axis direction of the optical imaging lens group and a negative refractive power in the X-axis direction of the optical imaging lens group. An object-side surface S15 of the eighth lens E8 is a concave surface, and an image-side surface S16 of the eighth lens E8 is a convex surface. The optical filter E9 has an object-side surface S17 and an image-side surface S18. Light from an object sequentially passes through the surfaces S1-S18 and finally forms an image on the image plane S19.

In this example, a total effective focal length fx of the optical imaging lens group in the X-axis direction is 4.20 mm, and a total effective focal length fy of the optical imaging lens group in the Y-axis direction is 3.15 mm. A total track length TTL of the optical imaging lens group is 7.77 mm. Half of a diagonal length ImgH of an effective pixel area on the image plane S19 of the optical imaging lens group is 3.40 mm. A maximal field-of-view FOV of the optical imaging lens group is 87.1°. An f-number Fnoy of the optical imaging lens group in the Y-axis direction is 2.58, and an f-number Fnox of the optical imaging lens group in the X-axis direction is 2.85.

Table 4 is a table showing basic parameters of the optical imaging lens group in Embodiment 2. Here, the units of a radius of curvature, a thickness/distance, a focal length Y and a focal length X are millimeters (mm). Tables 5-1 and 5-2 show the high-order coefficients applicable to the rotationally symmetric aspheric surfaces in Embodiment 2. Here, the surface type of each rotationally symmetric aspheric surface may be defined using the formula (1) given in Embodiment 1. Tables 6-1 to 6-3 respectively show the Zernike polynomial coefficients applicable to the non-rotationally symmetric aspheric surfaces in Embodiment 2. Here, the surface type of a non-rotationally symmetric aspheric surface may be defined using the formulas (2) and (3) given in Embodiment 1.

TABLE 4

| surface number | surface type | radius of curvature | thickness/ distance | material refractive index | abbe number | focal length Y | focal length X | conic coefficient |
|---|---|---|---|---|---|---|---|---|
| OBJ | spherical | infinite | infinite | | | | | |
| S1(AAS) | aspheric | 16.662 | 0.2500 | 1.55 | 56.1 | −7.63 | −44.94 | 15.5068 |
| S2(AAS) | aspheric | 1.8641 | 0.7332 | | | | | −0.4776 |
| S3(AAS) | aspheric | 18.5187 | 0.5439 | 1.67 | 19.2 | 12.44 | 73.24 | 98.0778 |
| S4(AAS) | aspheric | 19.3430 | 0.5780 | | | | | 96.9707 |
| S5(AAS) | aspheric | 11.6309 | 0.6683 | 1.65 | 23.5 | −16.87 | −13.69 | −97.7337 |
| S6(AAS) | aspheric | 0.540 | 0.2153 | | | | | −0.8713 |
| S7 | aspheric | 1.6929 | 0.3892 | 1.55 | 56.1 | 2.82 | | −0.0100 |
| S8 | aspheric | −15.678 | 0.0400 | | | | | −3.6134 |
| STO | spherical | infinite | 0.0540 | | | | | |
| S9 | aspheric | 2.7806 | 0.4690 | 1.67 | 19.2 | −6.41 | | −0.3075 |
| S10 | aspheric | 1.5795 | 0.7061 | | | | | −0.1029 |
| S11 | aspheric | 2.8883 | 0.3295 | 1.55 | 56.1 | 87.69 | | −0.0410 |
| S12 | aspheric | 2.9500 | 0.5322 | | | | | 0.3484 |
| S13 | aspheric | 7.6698 | 0.4692 | 1.55 | 56.1 | 2.96 | | 6.7544 |
| S14 | aspheric | −2.0034 | 0.6796 | | | | | 0.0148 |
| S15 | aspheric | −0.9046 | 0.3300 | 1.54 | 55.9 | −3.63 | −2.04 | −1.0055 |

TABLE 4-continued

| surface number | surface type | radius of curvature | thickness/ distance | material refractive index | abbe number | focal length Y | focal length X | conic coefficient |
|---|---|---|---|---|---|---|---|---|
| S16(AAS) | aspheric | −4.7697 | 0.0400 | | | | | 0.0000 |
| S17 | spherical | infinite | 0.2100 | 1.52 | 64.2 | | | |
| S18 | spherical | infinite | 0.5295 | | | | | |
| S19 | spherical | infinite | | | | | | |

TABLE 5-1

| surface number | $A_4$ | $A_6$ | $A_8$ | $A_{10}$ | $A_{12}$ | $A_{14}$ | $A_{16}$ |
|---|---|---|---|---|---|---|---|
| S7 | 9.1463E−03 | 5.3139E−03 | 9.5534E−04 | 1.8170E−04 | 3.1829E−05 | 3.7658E−06 | −2.4838E−06 |
| S8 | 2.3419E−03 | 5.2959E−03 | −4.9667E−04 | 2.3118E−04 | −4.8193E−05 | 1.2433E−05 | −8.1720E−08 |
| S9 | −2.5033E−02 | 3.1140E−03 | −7.9817E−04 | 9.3800E−05 | −3.2061E−05 | 3.8824E−06 | −4.9099E−07 |
| S10 | −1.9728E−02 | 3.2733E−03 | −2.8857E−04 | 5.2019E−05 | −9.7160E−06 | −8.9719E−07 | 2.5741E−08 |
| S11 | −2.1803E−01 | 3.5729E−02 | −4.6490E−03 | 1.0093E−03 | −4.7018E−04 | 2.6349E−04 | −3.8988E−06 |
| S12 | −4.3982E−01 | 7.3059E−02 | −9.0684E−04 | 1.6489E−03 | −2.4313E−03 | 1.9483E−04 | 1.7177E−04 |
| S13 | −6.3782E−01 | 3.3426E−02 | 7.2291E−03 | 1.1025E−03 | −2.7936E−03 | −2.0424E−03 | −4.5806E−04 |
| S14 | 3.5383E−01 | 1.3779E−01 | −2.1756E−02 | −6.0306E−03 | 7.8764E−04 | 1.1716E−03 | 6.4961E−04 |
| S15 | 1.8877E+00 | −2.4070E−01 | 6.3990E−02 | −9.6123E−03 | −9.4614E−03 | 5.3103E−03 | 3.5117E−04 |

TABLE 5-2

| surface number | $A_{18}$ | $A_{20}$ | $A_{22}$ | $A_{24}$ | $A_{26}$ | $A_{28}$ |
|---|---|---|---|---|---|---|
| S7 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 | 0.0000E+00 |
| S12 | 1.3642E−04 | 0.0000E+00 | 0.0000E+00 | 0.0000E+00 | 0.0000E+00 | 0.0000E+00 |
| S13 | 2.0086E−04 | 1.6254E−04 | 6.4276E−05 | 0.0000E+00 | 0.0000E+00 | 0.0000E+00 |
| S14 | −1.0619E−04 | −1.1026E−04 | 7.7289E−05 | −1.7149E−05 | −2.9498E−05 | 0.0000E+00 |
| S15 | −6.2916E−04 | −4.6544E−06 | 6.8528E−05 | −5.3670E−05 | 4.9765E−05 | −4.6928E−05 |

40

TABLE 6-1

| AAS surface | $C_2$ | $C_5$ | $C_6$ | $C_{12}$ | $C_{13}$ | $C_{14}$ | $C_{23}$ |
|---|---|---|---|---|---|---|---|
| S1 | −7.6943E−03 | −1.1409E−01 | 2.3817E−03 | 2.1375E−02 | −6.0266E−03 | 6.9277E−03 | 2.0597E−03 |
| S2 | −3.3639E−01 | −2.6198E−01 | −3.4816E−01 | 2.3353E−02 | −2.1771E−02 | −1.1598E−02 | −4.6434E−03 |
| S3 | −1.2211E−02 | 2.4994E−02 | −9.5497E−03 | −2.1821E−02 | 7.3122E−03 | 3.1007E−03 | −3.4375E−03 |
| S4 | −2.4799E−02 | 1.9055E−02 | −1.3871E−02 | −1.0886E−02 | −1.7502E−02 | 1.2100E−02 | −6.3150E−05 |
| S5 | −3.2953E−01 | 1.9498E−02 | −6.1712E−02 | 2.6758E−03 | −2.0805E−02 | 1.1243E−02 | 1.5778E−03 |
| S6 | −4.1177E−01 | 4.0644E−02 | −6.1687E−01 | 3.1731E−04 | −2.2147E−03 | −3.3771E−02 | 3.2121E−04 |
| S16 | −8.7854E−02 | 1.4911E−01 | −1.6421E−01 | 3.7182E−02 | −1.1587E−01 | −1.2512E−01 | 1.2168E−02 |

TABLE 6-2

| AAS surface | $C_{24}$ | $C_{25}$ | $C_{26}$ | $C_{38}$ | $C_{39}$ | $C_{40}$ | $C_{41}$ |
|---|---|---|---|---|---|---|---|
| S1 | 1.7634E−03 | 2.8491E−03 | −1.7482E−03 | 4.8693E−04 | 2.0847E−04 | 8.3733E−04 | −7.7201E−04 |
| S2 | 4.6144E−03 | −4.6364E−03 | 2.6557E−04 | 5.3777E−04 | −4.7201E−04 | 5.2975E−04 | −4.7610E−04 |
| S3 | 7.2435E−04 | 1.5030E−04 | −1.5690E−03 | −1.6787E−03 | 8.0629E−05 | −1.0277E−03 | 1.8500E−03 |
| S4 | 4.4464E−03 | −4.6730E−03 | 9.2878E−04 | −1.3533E−03 | 9.1399E−04 | 3.6401E−04 | 7.0983E−05 |
| S5 | 2.7519E−03 | −2.6222E−03 | 1.3564E−03 | −1.1708E−05 | 7.7760E−04 | 3.9570E−04 | −1.7609E−04 |
| S6 | 2.2265E−04 | −1.8164E−04 | −3.5280E−03 | 1.1520E−04 | 1.1501E−04 | 6.2830E−05 | −7.3054E−05 |
| S16 | −2.5731E−02 | −1.0208E−02 | −1.6917E−02 | −8.2189E−04 | −6.2693E−03 | −7.2770E−03 | −2.8516E−03 |

TABLE 6-3

| AAS surface | $C_{42}$ | $C_{57}$ | $C_{58}$ | $C_{59}$ | $C_{60}$ | $C_{61}$ | $C_{62}$ |
|---|---|---|---|---|---|---|---|
| S1  | 1.5044E−03  | −6.3385E−04 | 2.7738E−04  | −8.4090E−05 | 5.8840E−04  | −4.8530E−04 | 1.0426E−04 |
| S2  | 1.7911E−04  | −3.3962E−04 | 3.2405E−04  | −3.3965E−04 | 3.2592E−04  | −3.3902E−04 | 8.8302E−05 |
| S3  | −1.9439E−03 | 1.6978E−04  | −3.9205E−04 | −2.5094E−04 | −3.5749E−04 | −5.7830E−05 | 6.4617E−05 |
| S4  | −1.1824E−04 | −1.9396E−04 | −3.4871E−04 | −9.9044E−05 | −9.7957E−05 | −1.8262E−04 | 1.2512E−04 |
| S5  | 3.3183E−04  | −1.9350E−04 | −2.3957E−05 | 6.4123E−07  | 3.4497E−05  | −4.7590E−05 | −9.3710E−05 |
| S6  | −7.7226E−04 | −6.0534E−06 | 3.1941E−05  | 1.1384E−05  | 1.2372E−05  | −1.8717E−05 | −1.2211E−04 |
| S16 | 3.1573E−02  | −4.6312E−03 | −2.9974E−03 | −1.1483E−03 | −1.7216E−03 | 4.6990E−03  | −2.8308E−04 |

Figure 4:
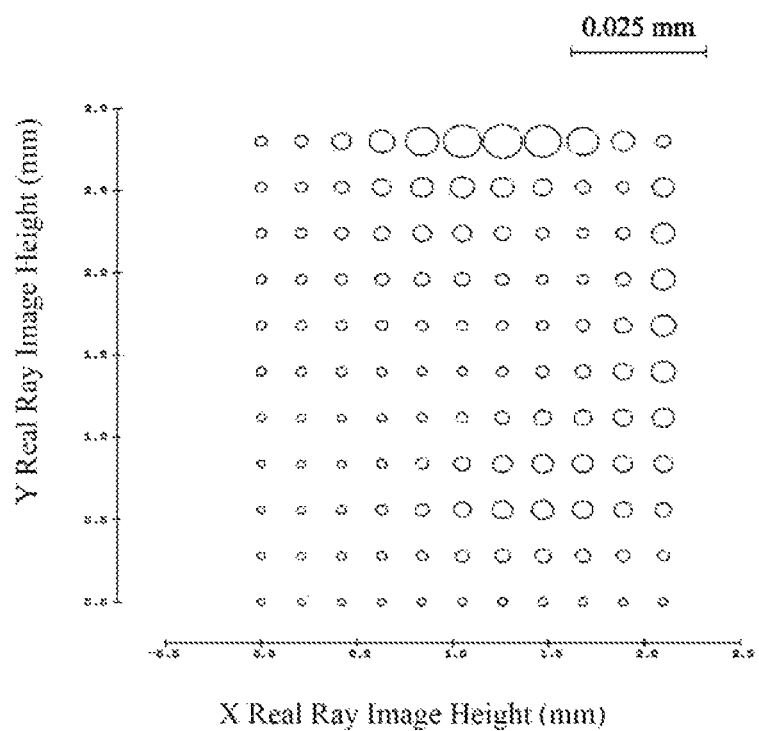
FIG. 4 schematically illustrates a situation of an RMS spot diameter of the optical imaging lens group according to Embodiment 2 of the present disclosure in a first quadrant.

FIG. 4 illustrates a size of an RMS spot diameter of the optical imaging lens group of Embodiment 2 at a different image height in a first quadrant. FIG. 4 illustrates a relationship between the RMS spot diameter and a real ray image height. In FIG. 4, each grid of a coordinate axis corresponds to 0.025 mm, a minimal RMS spot diameter is 0.0016847 mm, a maximal RMS spot diameter is 0.0084846 mm, an average value of RMS spot diameters is 0.0031599mm, and a standard deviation of the RMS spot diameter is 0.0013892 mm. It can be seen from FIG. 4 that the optical imaging lens group given in Embodiment 2 can achieve a good imaging quality.

Embodiment 3

Figure 5:
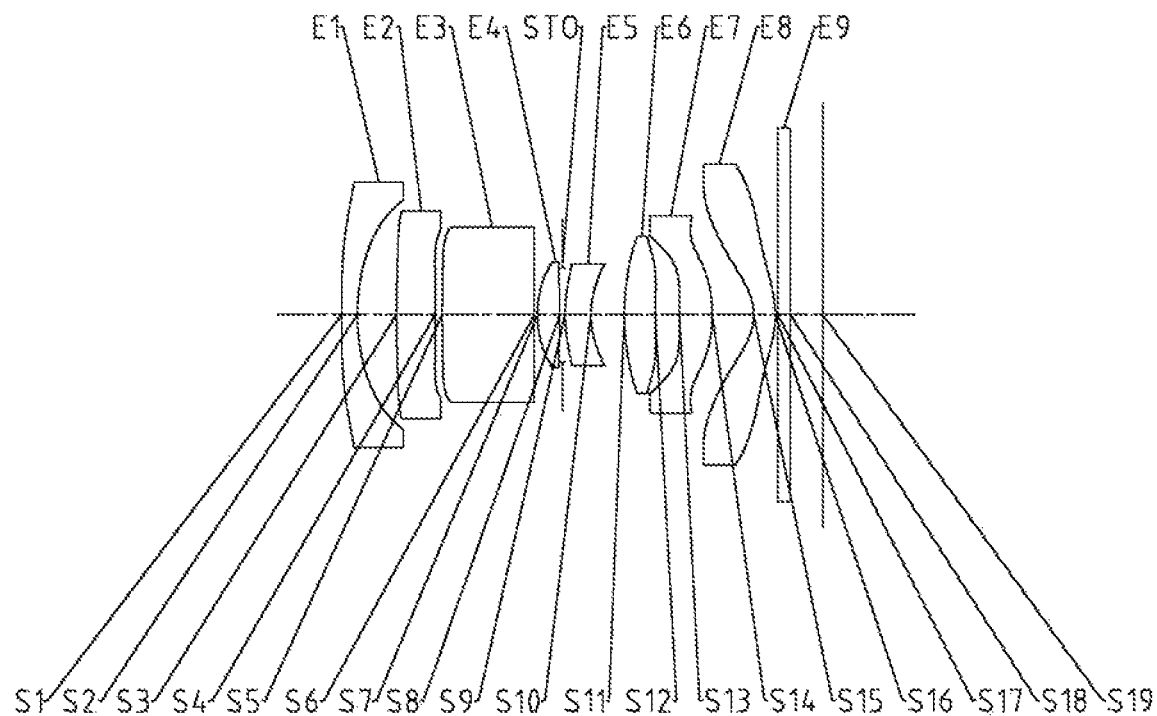
FIG. 5 is a schematic structural diagram of an optical imaging lens group according to Embodiment 3 of the present disclosure.

An optical imaging lens group according to Embodiment 3 of the present disclosure is described below with reference to FIGS. 5 and 6. FIG. 5 is a schematic structural diagram of the optical imaging lens group according to Embodiment 3 of the present disclosure.

As shown in FIG. 5, the optical imaging lens group includes, sequentially from an object side to an image side, a first lens E1, a second lens E2, a third lens E3, a fourth lens E4, a diaphragm STO, a fifth lens E5, a sixth lens E6, a seventh lens E7, an eighth lens E8, an optical filter E9 and an image plane S19.

The first lens E1 has a negative refractive power in a Y-axis direction of the optical imaging lens group and a negative refractive power in an X-axis direction of the optical imaging lens group. An object-side surface S1 of the first lens E1 is a convex surface, and an image-side surface S2 of the first lens E1 is a concave surface. The second lens E2 has a positive refractive power in the Y-axis direction of the optical imaging lens group and a negative refractive power in the X-axis direction of the optical imaging lens group. An object-side surface S3 of the second lens E2 is a concave surface, and an image-side surface S4 of the second lens E2 is a concave surface. The third lens E3 has a positive refractive power in the Y-axis direction of the optical imaging lens group and a negative refractive power in the X-axis direction of the optical imaging lens group. An object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface.

The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power in the Y-axis direction of the optical imaging lens group and a negative refractive power in the X-axis direction of the optical imaging lens group. An object-side surface S15 of the eighth lens E8 is a concave surface, and an image-side surface S16 of the eighth lens E8 is a convex surface. The optical filter E9 has an object-side surface S17 and an image-side surface S18. Light from an object sequentially passes through the surfaces S1-S18 and finally forms an image on the image plane S19.

In this example, a total effective focal length fx of the optical imaging lens group in the X-axis direction is 4.20 mm, and a total effective focal length fy of the optical imaging lens group in the Y-axis direction is 3.15 mm. A total track length TTL of the optical imaging lens group is 7.78 mm. Half of a diagonal length ImgH of an effective pixel area on the image plane S19 of the optical imaging lens group is 3.40 mm. A maximal field-of-view FOV of the optical imaging lens group is 86.6°. An f-number Fnoy of the optical imaging lens group in the Y-axis direction is 2.57, and an f-number Fnox of the optical imaging lens group in the X-axis direction is 2.84.

Table 7 is a table showing basic parameters of the optical imaging lens group in Embodiment 3. Here, the units of a radius of curvature, a thickness/distance, a focal length Y and a focal length X are millimeters (mm). Tables 8-1 and 8-2 show the high-order coefficients applicable to the rotationally symmetric aspheric surfaces in Embodiment 3. Here, the surface type of each rotationally symmetric aspheric surface may be defined using the formula (1) given in Embodiment 1. Tables 9-1 to 9-3 respectively show the Zernike polynomial coefficients applicable to the non-rotationally symmetric aspheric surfaces in Embodiment 3. Here, the surface type of a non-rotationally symmetric aspheric surface may be defined using the formulas (2) and (3) given in Embodiment 1.

TABLE 7

| surface number | surface type | radius of curvature | thickness/ distance | material refractive index | abbe number | focal length Y | focal length X | conic coefficient |
|---|---|---|---|---|---|---|---|---|
| OBJ | spherical | infinite | infinite | | | | | |
| S1(AAS) | aspheric | 17.949 | 0.2590 | 1.55 | 56.1 | −6.67 | −54.70 | −48.0846 |
| S2(AAS) | aspheric | 1.8799 | 0.6381 | | | | | −0.4776 |
| S3(AAS) | aspheric | −167.5430 | 0.7497 | 1.67 | 19.2 | 68.42 | −1191.67 | −99.0000 |
| S4(AAS) | aspheric | 26.4846 | 0.5143 | | | | | 88.6833 |
| S5(AAS) | aspheric | 6.6508 | 0.5730 | 1.65 | 23.5 | 70.69 | −13.91 | −26.5439 |
| S6(AAS) | aspheric | 0.533 | 0.3683 | | | | | −0.8716 |
| S7 | aspheric | 1.7897 | 0.3675 | 1.55 | 56.1 | 2.78 | | 0.2986 |
| S8 | aspheric | −9.275 | 0.0400 | | | | | −99.0000 |
| STO | spherical | infinite | 0.0443 | | | | | |
| S9 | aspheric | 2.2886 | 0.4237 | 1.67 | 19.2 | −6.24 | | −1.4440 |
| S10 | aspheric | 1.3737 | 0.5472 | | | | | −0.5223 |
| S11 | aspheric | 3.5305 | 0.5095 | 1.55 | 56.1 | 10.36 | | 3.0524 |
| S12 | aspheric | 8.9212 | 0.3471 | | | | | 10.8693 |
| S13 | aspheric | 22.6564 | 0.5366 | 1.55 | 56.1 | 4.14 | | −88.5053 |
| S14 | aspheric | −2.4911 | 0.7283 | | | | | 0.1841 |
| S15 | aspheric | −0.8542 | 0.3539 | 1.54 | 55.9 | −3.91 | −2.09 | −1.0336 |
| S16(AAS) | aspheric | −5.3119 | 0.0400 | | | | | 0.0000 |
| S17 | spherical | infinite | 0.2100 | 1.52 | 64.2 | | | |
| S18 | spherical | infinite | 0.5295 | | | | | |
| S19 | spherical | infinite | | | | | | |

TABLE 8-1

| surface number | $A_4$ | $A_6$ | $A_8$ | $A_{10}$ | $A_{12}$ | $A_{14}$ | $A_{16}$ |
|---|---|---|---|---|---|---|---|
| S7  | 1.1446E−02  | 1.5127E−03  | 2.9271E−04  | 1.1608E−05  | −3.4849E−06 | −1.7287E−06 | −1.5317E−06 |
| S8  | 8.1742E−03  | 1.6821E−03  | −4.2271E−04 | 1.3891E−04  | −4.0076E−05 | 7.9548E−06  | −2.0057E−06 |
| S9  | −3.1274E−02 | 2.5968E−03  | −7.9317E−04 | 1.1907E−04  | −4.4074E−05 | 7.9097E−06  | −1.5544E−06 |
| S10 | −3.8487E−02 | 4.3870E−03  | −4.0614E−04 | 8.8467E−05  | −1.3052E−05 | 1.6256E−06  | −1.6842E−08 |
| S11 | −6.8863E−02 | 1.0404E−02  | −1.0071E−04 | 4.8777E−04  | −4.6128E−05 | 3.5325E−05  | −8.1389E−06 |
| S12 | −2.4912E−01 | 2.3504E−02  | 6.3981E−03  | 1.3146E−03  | −8.2770E−04 | −3.2085E−04 | −7.1922E−05 |
| S13 | −5.0083E−01 | 2.7489E−02  | 1.4213E−02  | −2.0916E−03 | −2.4659E−03 | −5.0584E−04 | 3.8818E−06 |
| S14 | 1.5603E−01  | 1.2145E−01  | −2.2918E−02 | −1.0096E−02 | 4.4057E−03  | 7.8551E−04  | −7.5345E−04 |
| S15 | 1.6690E+00  | −2.0692E−01 | 2.9382E−02  | 4.2764E−03  | −5.8317E−03 | 1.1019E−04  | 1.4608E−03 |

TABLE 8-2

| surface number | $A_{18}$ | $A_{20}$ | $A_{22}$ | $A_{24}$ | $A_{26}$ | $A_{28}$ |
|---|---|---|---|---|---|---|
| S7  | 0.0000E+00  | 0.0000E+00  | 0.0000E+00  | 0.0000E+00  | 0.0000E+00 | 0.0000E+00 |
| S8  | 0.0000E+00  | 0.0000E+00  | 0.0000E+00  | 0.0000E+00  | 0.0000E+00 | 0.0000E+00 |
| S9  | 0.0000E+00  | 0.0000E+00  | 0.0000E+00  | 0.0000E+00  | 0.0000E+00 | 0.0000E+00 |
| S10 | 0.0000E+00  | 0.0000E+00  | 0.0000E+00  | 0.0000E+00  | 0.0000E+00 | 0.0000E+00 |
| S11 | 0.0000E+00  | 0.0000E+00  | 0.0000E+00  | 0.0000E+00  | 0.0000E+00 | 0.0000E+00 |
| S12 | 7.5773E−06  | 0.0000E+00  | 0.0000E+00  | 0.0000E+00  | 0.0000E+00 | 0.0000E+00 |
| S13 | −1.5723E−06 | −2.0053E−05 | −2.0262E−05 | 0.0000E+00  | 0.0000E+00 | 0.0000E+00 |
| S14 | 7.3348E−05  | 1.2827E−04  | −5.6920E−05 | −1.4493E−05 | 1.5402E−05 | 0.0000E+00 |
| S15 | −3.1092E−04 | −2.2165E−04 | 1.1389E−04  | −2.3633E−05 | 3.8768E−06 | 1.5676E−06 |

TABLE 9-1

| AAS surface | $C_2$ | $C_5$ | $C_6$ | $C_{12}$ | $C_{13}$ | $C_{14}$ | $C_{23}$ |
|---|---|---|---|---|---|---|---|
| S1  | −1.2207E−02 | −7.4113E−02 | 7.1738E−04  | 3.6024E−02  | −5.0485E−03 | 7.6412E−03  | 9.8325E−03 |
| S2  | −3.4932E−01 | −2.7452E−01 | −3.6190E−01 | 2.6153E−02  | −2.4450E−02 | −1.2333E−02 | −5.4062E−03 |
| S3  | 1.8436E−02  | −6.0932E−02 | 2.5904E−02  | −4.5969E−02 | 2.7950E−03  | 1.1365E−02  | −6.5558E−03 |
| S4  | −1.2401E−02 | −7.0739E−02 | −4.7401E−03 | −2.5736E−02 | −1.7723E−02 | 1.2509E−02  | 3.1715E−04 |
| S5  | −3.6928E−01 | −2.0568E−01 | −5.0428E−02 | 8.6170E−04  | −2.2674E−02 | 9.2981E−03  | 2.7353E−03 |
| S6  | −3.2951E−01 | 4.0919E−02  | −5.7339E−01 | 9.7939E−04  | −1.9364E−03 | −3.2892E−02 | 1.5351E−04 |
| S16 | 1.5813E−02  | 1.2254E−01  | 3.9464E−02  | 2.7042E−02  | −1.0575E−01 | −4.6113E−02 | 2.5546E−02 |

TABLE 9-2

| AAS surface | $C_{24}$ | $C_{25}$ | $C_{26}$ | $C_{38}$ | $C_{39}$ | $C_{40}$ | $C_{41}$ |
|---|---|---|---|---|---|---|---|
| S1  | −4.3780E−03 | 3.8405E−03  | −4.5282E−03 | 2.7597E−03  | 3.0898E−04  | −1.1659E−03 | −9.1191E−04 |
| S2  | 5.3855E−03  | −5.3993E−03 | 3.7445E−04  | 7.4001E−04  | −6.7009E−04 | 7.3148E−04  | −6.7457E−04 |
| S3  | 4.5022E−03  | −3.8280E−03 | 2.9460E−03  | −1.0935E−03 | 3.5064E−04  | 6.9224E−04  | 1.5592E−03  |
| S4  | 6.6937E−03  | −8.2404E−03 | 4.7495E−03  | −1.2323E−03 | 1.1868E−03  | 1.4471E−03  | −3.9993E−05 |
| S5  | 4.8591E−03  | −5.1903E−03 | 4.8951E−03  | 6.1161E−05  | 1.2026E−03  | 9.6300E−04  | −6.2116E−05 |
| S6  | 2.0356E−04  | −3.7469E−05 | −2.1495E−03 | 7.1438E−05  | 8.5410E−05  | 5.6341E−05  | −3.2823E−05 |
| S16 | −1.1199E−02 | −3.2286E−03 | −4.6368E−02 | 1.0510E−02  | −3.7450E−03 | −1.3920E−03 | −4.9466E−03 |

TABLE 9-3

| AAS surface | $C_{42}$ | $C_{57}$ | $C_{58}$ | $C_{59}$ | $C_{60}$ | $C_{61}$ | $C_{62}$ |
|---|---|---|---|---|---|---|---|
| S1  | 5.8401E−04  | 1.0030E−03  | −1.8878E−04 | 2.2359E−04  | 1.2521E−04  | −2.0755E−04 | −1.7121E−04 |
| S2  | 2.3916E−04  | −4.0518E−04 | 3.8661E−04  | −4.0522E−04 | 3.8883E−04  | −4.0447E−04 | 1.0535E−04  |
| S3  | −7.1100E−04 | −2.3156E−05 | −9.4580E−07 | −2.7933E−04 | 2.4244E−06  | −1.4310E−04 | 2.4021E−04  |
| S4  | 1.4341E−04  | −6.6321E−06 | −2.7496E−04 | −1.1532E−04 | 1.3696E−04  | −2.3364E−04 | 2.4229E−04  |
| S5  | 1.5742E−04  | −2.2119E−06 | −4.0570E−05 | 3.9550E−05  | 7.9545E−05  | −5.7989E−05 | 1.6838E−05  |
| S6  | −5.2320E−04 | 6.6374E−06  | 2.2580E−05  | 1.3962E−05  | 1.3102E−05  | −5.3166E−06 | −9.7230E−05 |
| S16 | 1.9937E−02  | −1.9386E−03 | −5.8922E−03 | −5.4250E−04 | −6.5256E−04 | 4.8760E−03  | −3.4697E−03 |

Figure 6:
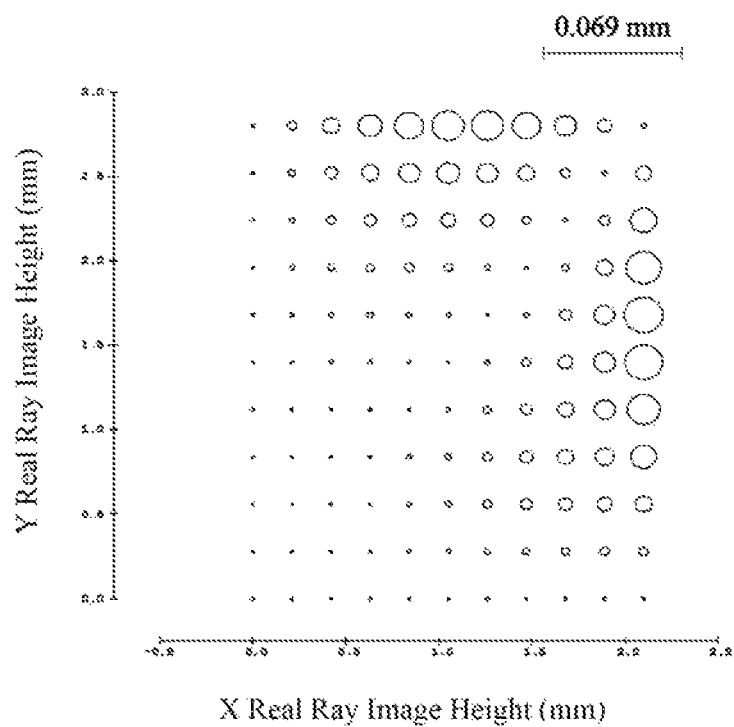
FIG. 6 schematically illustrates a situation of an RMS spot diameter of the optical imaging lens group according to Embodiment 3 of the present disclosure in a first quadrant.

FIG. 6 illustrates a size of an RMS spot diameter of the optical imaging lens group of Embodiment 3 at a different image height in a first quadrant. FIG. 6 illustrates a relationship between the RMS spot diameter and a real ray image height. In FIG. 6, each grid of a coordinate axis corresponds to 0.069 mm, a minimal RMS spot diameter is 0.0015728 mm, a maximal RMS spot diameter is 0.024056 mm, an average value of RMS spot diameters is 0.0061905 mm, and a standard deviation of the RMS spot diameter is 0.0054017 mm. It can be seen from FIG. 6 that the optical imaging lens group given in Embodiment 3 can achieve a good imaging quality.

Embodiment 4

Figure 7:
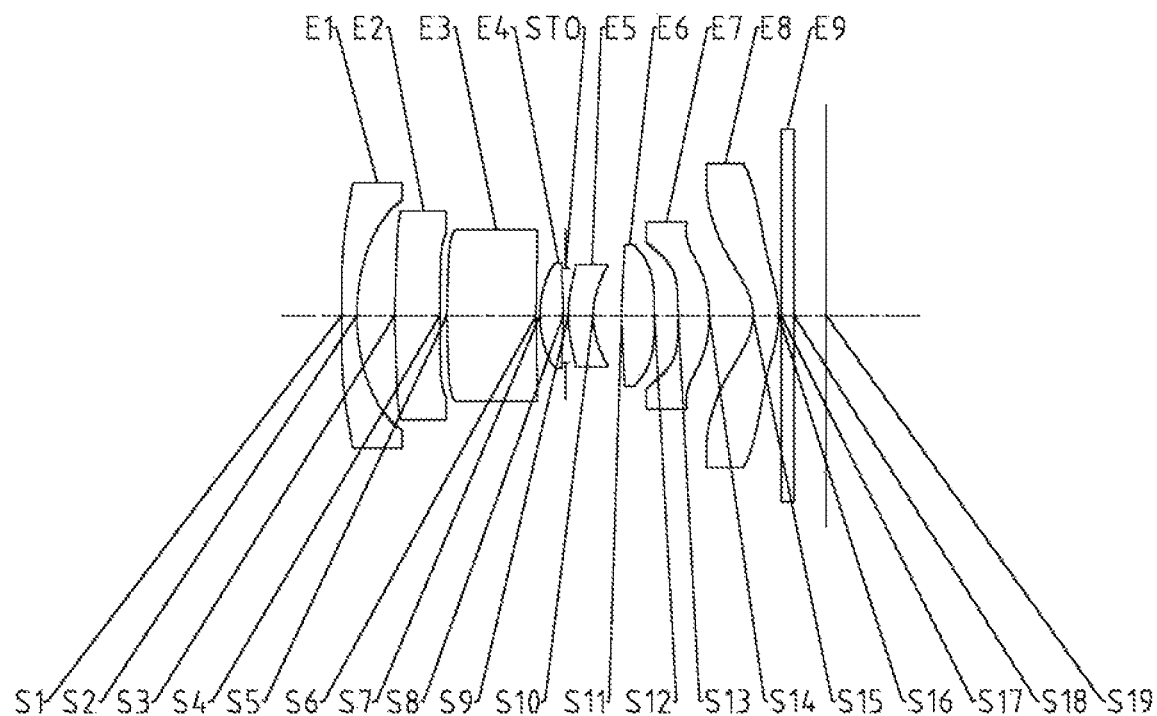
FIG. 7 is a schematic structural diagram of an optical imaging lens group according to Embodiment 4 of the present disclosure.

An optical imaging lens group according to Embodiment 4 of the present disclosure is described below with reference to FIGS. 7 and 8. FIG. 7 is a schematic structural diagram of the optical imaging lens group according to Embodiment 4 of the present disclosure.

As shown in FIG. 7, the optical imaging lens group includes, sequentially from an object side to an image side, a first lens E1, a second lens E2, a third lens E3, a fourth lens E4, a diaphragm STO, a fifth lens E5, a sixth lens E6, a seventh lens E7, an eighth lens E8, an optical filter E9 and an image plane S19.

The first lens E1 has a negative refractive power in a Y-axis direction of the optical imaging lens group and a negative refractive power in an X-axis direction of the optical imaging lens group. An object-side surface S1 of the first lens E1 is a convex surface, and an image-side surface S2 of the first lens E1 is a concave surface. The second lens E2 has a positive refractive power in the Y-axis direction of the optical imaging lens group and a positive refractive power in the X-axis direction of the optical imaging lens group. An object-side surface S3 of the second lens E2 is a concave surface, and an image-side surface S4 of the second lens E2 is a convex surface. The third lens E3 has a positive refractive power in the Y-axis direction of the optical imaging lens group and a negative refractive power in the X-axis direction of the optical imaging lens group. An object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface.

The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a positive refractive power, an object-side surface S13 of the seventh lens E7 is a concave surface, and an image-side surface S14 of the seventh lens E7 is a convex surface. The eighth lens E8 has a negative refractive power in the Y-axis direction of the optical imaging lens group and a negative refractive power in the X-axis direction of the optical imaging lens group. An object-side surface S15 of the eighth lens E8 is a concave surface, and an image-side surface S16 of the eighth lens E8 is a convex surface. The optical filter E9 has an object-side surface S17 and an image-side surface S18. Light from an object sequentially passes through the surfaces S1-S18 and finally forms an image on the image plane S19.

In this example, a total effective focal length fx of the optical imaging lens group in the X-axis direction is 4.20 mm, and a total effective focal length fy of the optical imaging lens group in the Y-axis direction is 3.15 mm. A total track length TTL of the optical imaging lens group is 7.78 mm. Half of a diagonal length ImgH of an effective pixel area on the image plane S19 of the optical imaging lens group is 3.40 mm. A maximal field-of-view FOV of the optical imaging lens group is 86.6°. An f-number Fnoy of the optical imaging lens group in the Y-axis direction is 2.56, and an f-number Fnox of the optical imaging lens group in the X-axis direction is 2.83.

Table 10 is a table showing basic parameters of the optical imaging lens group in Embodiment 4. Here, the units of a radius of curvature, a thickness/distance, a focal length Y and a focal length X are millimeters (mm). Tables 11-1 and 11-2 show the high-order coefficients applicable to the rotationally symmetric aspheric surfaces in Embodiment 4.

Here, the surface type of each rotationally symmetric aspheric surface may be defined using the formula (1) given in Embodiment 1. Tables 12-1 to 12-3 show the Zernike polynomial coefficients applicable to the non-rotationally symmetric aspheric surfaces in Embodiment 4. Here, the surface type of a non-rotationally symmetric aspheric surface may be defined using the formulas (2) and (3) given in Embodiment 1.

TABLE 10

| surface number | surface type | radius of curvature | thickness/ distance | material refractive index | abbe number | focal length Y | focal length X | conic coefficient |
|---|---|---|---|---|---|---|---|---|
| OBJ | spherical | infinite | infinite | | | | | |
| S1(AAS) | aspheric | 22.845 | 0.2500 | 1.55 | 56.1 | −6.43 | −65.07 | −57.3133 |
| S2(AAS) | aspheric | 1.9053 | 0.6220 | | | | | −0.4776 |
| S3(AAS) | aspheric | −71.7704 | 0.8550 | 1.67 | 19.2 | 248.75 | 86.06 | −99.0000 |
| S4(AAS) | aspheric | −400.0000 | 0.5166 | | | | | −99.0000 |
| S5(AAS) | aspheric | 7.4162 | 0.5119 | 1.65 | 23.5 | 53.65 | −9.84 | −17.8861 |
| S6(AAS) | aspheric | 0.529 | 0.3347 | | | | | −0.8721 |
| S7 | aspheric | 1.8954 | 0.3826 | 1.55 | 56.1 | 2.66 | | 0.6578 |
| S8 | aspheric | −5.764 | 0.0400 | | | | | −99.0000 |
| STO | spherical | infinite | 0.0400 | | | | | |
| S9 | aspheric | 2.0807 | 0.4076 | 1.67 | 19.2 | −6.17 | | −1.1659 |
| S10 | aspheric | 1.2793 | 0.4669 | | | | | −0.5915 |
| S11 | aspheric | 6.4908 | 0.5374 | 1.55 | 56.1 | 7.79 | | 1.2425 |
| S12 | aspheric | −11.9687 | 0.3869 | | | | | 95.4591 |
| S13 | aspheric | −39.0924 | 0.5126 | 1.55 | 56.1 | 4.59 | | 99.0000 |
| S14 | aspheric | −2.3678 | 0.7176 | | | | | 0.1609 |
| S15 | aspheric | −0.8503 | 0.4186 | 1.54 | 55.9 | −3.93 | −2.07 | −1.0492 |
| S16(AAS) | aspheric | −5.7560 | 0.0400 | | | | | 0.0000 |
| S17 | spherical | infinite | 0.2100 | 1.52 | 64.2 | | | |
| S18 | spherical | infinite | 0.5295 | | | | | |
| S19 | spherical | infinite | | | | | | |

TABLE 11-1

| surface number | $A_4$ | $A_6$ | $A_8$ | $A_{10}$ | $A_{12}$ | $A_{14}$ | $A_{16}$ |
|---|---|---|---|---|---|---|---|
| S7 | 1.6574E−02 | 1.4586E−03 | 3.6257E−04 | 4.2554E−05 | 1.1082E−05 | 2.2662E−06 | 5.5455E−07 |
| S8 | 1.0975E−02 | 1.5605E−03 | −2.3909E−04 | 1.1654E−04 | −2.5583E−05 | 6.5578E−06 | −1.0614E−06 |
| S9 | −3.0064E−02 | 9.6192E−04 | −6.7011E−04 | 8.1427E−05 | −4.3594E−05 | 7.2194E−06 | −2.1016E−06 |
| S10 | −4.0142E−02 | 3.8460E−03 | −4.1494E−04 | 8.8278E−05 | −1.4979E−05 | 2.1087E−06 | −9.1532E−08 |
| S11 | −5.9555E−02 | 1.1177E−02 | 4.1505E−03 | 1.7950E−03 | −5.8613E−05 | −1.7664E−04 | −6.9731E−05 |
| S12 | −2.8631E−01 | 2.0708E−02 | 1.2955E−02 | 5.3499E−03 | 1.2035E−03 | 1.6693E−04 | −4.2851E−05 |
| S13 | −5.4049E−01 | 2.9984E−02 | 1.8504E−02 | −1.5305E−03 | −1.9832E−03 | −1.2086E−04 | 1.3281E−04 |
| S14 | 1.4593E−01 | 1.2889E−01 | −2.3135E−02 | −9.5626E−03 | 5.3870E−03 | 5.6756E−04 | −6.6288E−04 |
| S15 | 1.6684E+00 | −2.2058E−01 | 2.6765E−02 | 5.5294E−03 | −4.9557E−03 | 5.1637E−05 | 1.1674E−03 |

TABLE 11-2

| surface number | $A_{18}$ | $A_{20}$ | $A_{22}$ | $A_{24}$ | $A_{26}$ | $A_{28}$ |
|---|---|---|---|---|---|---|
| S7 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 | 0.0000E+00 |
| S12 | −1.2633E−05 | 0.0000E+00 | 0.0000E+00 | 0.0000E+00 | 0.0000E+00 | 0.0000E+00 |
| S13 | 8.2032E−05 | 5.7138E−05 | 1.9357E−05 | 0.0000E+00 | 0.0000E+00 | 0.0000E+00 |
| S14 | 4.1107E−04 | 2.1653E−04 | −2.0810E−05 | 5.7593E−05 | 6.3755E−05 | 0.0000E+00 |
| S15 | −3.8302E−04 | −1.1262E−04 | 1.3014E−04 | −4.7655E−05 | 2.6667E−06 | 3.0469E−06 |

TABLE 12-1

| AAS surface | $C_2$ | $C_5$ | $C_6$ | $C_{12}$ | $C_{13}$ | $C_{14}$ | $C_{23}$ |
|---|---|---|---|---|---|---|---|
| S1 | −1.0570E−02 | −6.4272E−02 | 3.5847E−04 | 3.5939E−02 | −1.0293E−02 | 5.4232E−03 | 8.4501E−03 |
| S2 | −3.4932E−01 | −2.7452E−01 | −3.6190E−01 | 2.6153E−02 | −2.4450E−02 | −1.2333E−02 | −5.4062E−03 |
| S3 | 2.5026E−02 | −7.1277E−02 | 3.0914E−02 | −4.4188E−02 | 6.5624E−03 | 1.0014E−02 | −5.9292E−03 |
| S4 | 8.2771E−03 | −8.9233E−02 | 1.4725E−02 | −2.3269E−02 | −1.2545E−02 | 1.1675E−02 | 6.9468E−04 |
| S5 | −3.6492E−01 | −4.4995E−02 | −4.5783E−02 | 2.5362E−03 | −2.0473E−02 | 8.3903E−03 | 2.7197E−03 |
| S6 | −3.2269E−01 | 3.7135E−02 | −5.7094E−01 | 1.3855E−03 | −2.3568E−03 | −3.4148E−02 | 1.9029E−04 |
| S16 | 6.7649E−03 | 6.7603E−02 | 2.3057E−02 | 1.6425E−03 | −1.5702E−01 | −6.1353E−02 | 1.3779E−02 |

TABLE 12-2

| AAS surface | $C_{24}$ | $C_{25}$ | $C_{26}$ | $C_{38}$ | $C_{39}$ | $C_{40}$ | $C_{41}$ |
|---|---|---|---|---|---|---|---|
| S1 | −4.8021E−03 | 2.9229E−03 | −4.7426E−03 | 2.4533E−03 | 2.9461E−04 | −9.2118E−04 | −6.2557E−04 |
| S2 | 5.3855E−03 | −5.3993E−03 | 3.7445E−04 | 7.4001E−04 | −6.7009E−04 | 7.3148E−04 | −6.7457E−04 |
| S3 | 4.3968E−03 | −3.3201E−03 | 3.4560E−03 | −1.2904E−03 | −2.9502E−04 | 3.7415E−04 | 1.0652E−03 |
| S4 | 5.1776E−03 | −7.1902E−03 | 5.4167E−03 | −1.7239E−03 | 4.4169E−04 | 7.2955E−04 | −1.0721E−04 |
| S5 | 4.1272E−03 | −4.6276E−03 | 5.9856E−03 | −5.6522E−04 | 7.4639E−04 | 6.7155E−04 | 8.5157E−05 |
| S6 | 2.5714E−04 | −6.2317E−05 | −2.6676E−03 | 7.2067E−05 | 1.0632E−04 | 7.5897E−05 | −3.4498E−05 |
| S16 | −2.9539E−02 | −1.6745E−02 | −5.0072E−02 | 1.5734E−03 | −1.0923E−02 | −6.5058E−03 | −5.8524E−03 |

TABLE 12-3

| AAS surface | $C_{42}$ | $C_{57}$ | $C_{58}$ | $C_{59}$ | $C_{60}$ | $C_{61}$ | $C_{62}$ |
|---|---|---|---|---|---|---|---|
| S1 | 5.3011E−04 | 9.2561E−04 | −1.9303E−04 | 2.3704E−04 | 6.0069E−05 | −1.3919E−04 | −2.3273E−04 |
| S2 | 2.3916E−04 | −4.0518E−04 | 3.8661E−04 | −4.0522E−04 | 3.8883E−04 | −4.0447E−04 | 1.0535E−04 |
| S3 | −4.0083E−04 | −7.1248E−05 | −4.9870E−05 | −3.0761E−04 | 2.2741E−05 | −1.0135E−04 | 2.6919E−04 |
| S4 | 4.3017E−04 | 1.5023E−04 | −2.0797E−04 | −1.0371E−04 | 6.0345E−05 | −1.4606E−04 | 2.4043E−04 |
| S5 | 9.9721E−05 | 5.1526E−05 | −3.6128E−05 | 4.9455E−05 | 5.8358E−05 | 1.0934E−05 | −1.6230E−05 |
| S6 | −6.6191E−04 | 4.4504E−06 | 2.0923E−05 | 2.0593E−05 | 1.6392E−05 | −2.6940E−06 | −1.3089E−04 |
| S16 | 2.1523E−02 | 7.4440E−04 | −1.0871E−02 | −1.6492E−03 | −1.8287E−03 | 6.3746E−03 | −6.0515E−03 |

Figure 8:
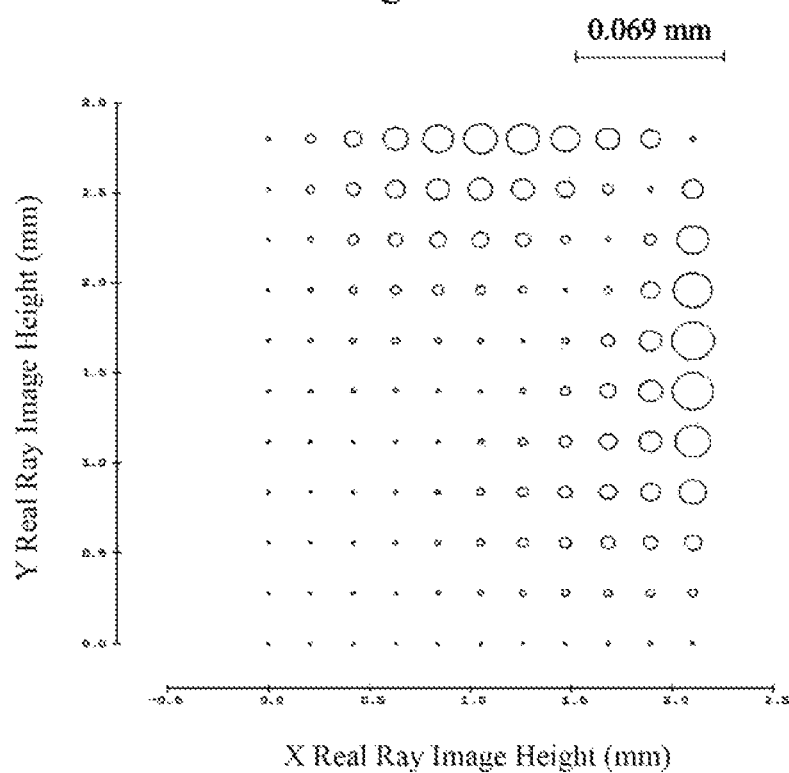
FIG. 8 schematically illustrates a situation of an RMS spot diameter of the optical imaging lens group according to Embodiment 4 of the present disclosure in a first quadrant.

FIG. 8 illustrates a size of an RMS spot diameter of the optical imaging lens group of Embodiment 4 at a different image height in a first quadrant. FIG. 8 illustrates a relationship between the RMS spot diameter and a real ray image height. In FIG. 8, each grid of a coordinate axis corresponds to 0.069 mm, a minimal RMS spot diameter is 0.0015343 mm, a maximal RMS spot diameter is 0.024167 mm, an average value of RMS spot diameters is 0.0061069 mm, and a standard deviation of the RMS spot diameter is 0.0053435 mm. It can be seen from FIG. 8 that the optical imaging lens group given in Embodiment 4 can achieve a good imaging quality.

Embodiment 5

Figure 9:
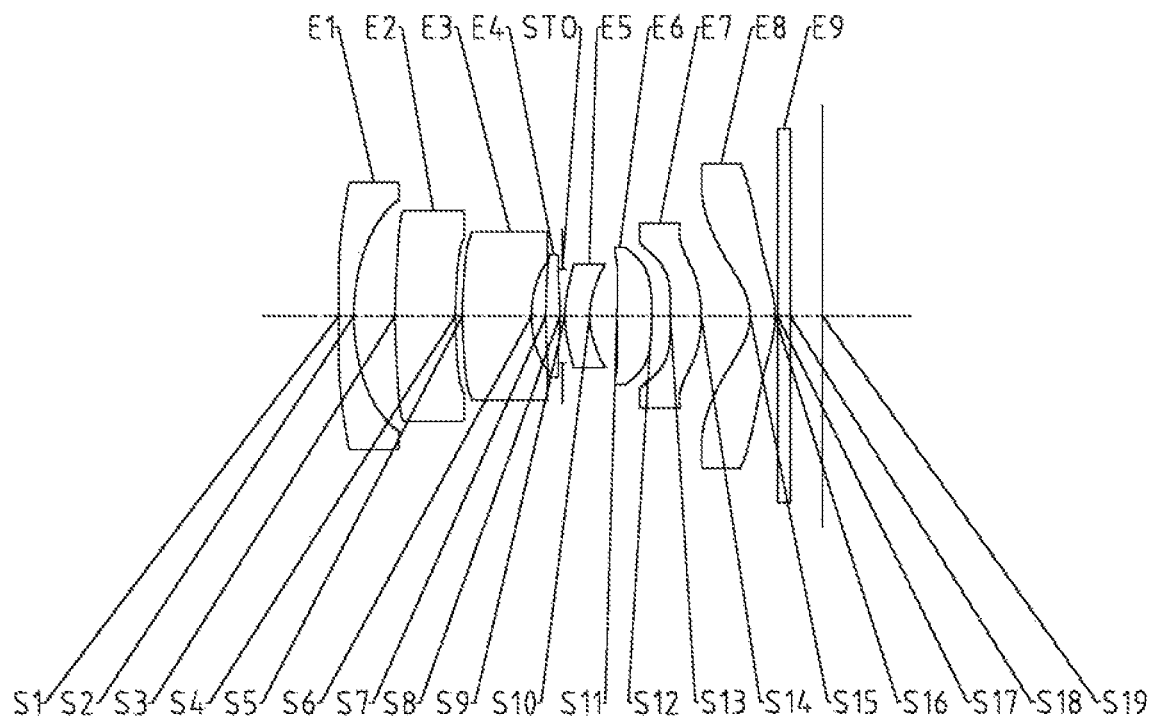
FIG. 9 is a schematic structural diagram of an optical imaging lens group according to Embodiment 5 of the present disclosure.

An optical imaging lens group according to Embodiment 5 of the present disclosure is described below with reference to FIGS. 9 and 10. FIG. 9 is a schematic structural diagram of the optical imaging lens group according to Embodiment 5 of the present disclosure.

As shown in FIG. 9, the optical imaging lens group includes, sequentially from an object side to an image side, a first lens E1, a second lens E2, a third lens E3, a fourth lens E4, a diaphragm STO, a fifth lens E5, a sixth lens E6, a seventh lens E7, an eighth lens E8, an optical filter E9 and an image plane S19.

The first lens E1 has a negative refractive power in a Y-axis direction of the optical imaging lens group and a negative refractive power in an X-axis direction of the optical imaging lens group. An object-side surface S1 of the first lens E1 is a convex surface, and an image-side surface S2 of the first lens E1 is a concave surface. The second lens E2 has a negative refractive power in the Y-axis direction of the optical imaging lens group and a positive refractive power in the X-axis direction of the optical imaging lens group. An object-side surface S3 of the second lens E2 is a concave surface, and an image-side surface S4 of the second lens E2 is a concave surface. The third lens E3 has a positive refractive power in the Y-axis direction of the optical imaging lens group and a negative refractive power in the X-axis direction of the optical imaging lens group. An object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface.

The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power in the Y-axis direction of the optical imaging lens group and a negative refractive power in the X-axis direction of the optical imaging lens group. An object-side surface S15 of the eighth lens E8 is a concave surface, and an image-side surface S16 of the eighth lens E8 is a convex surface. The optical filter E9 has an object-side surface S17 and an image-side surface S18. Light from an object sequentially passes through the surfaces S1-S18 and finally forms an image on the image plane S19.

TABLE 14-1

| surface number | $A_4$ | $A_6$ | $A_8$ | $A_{10}$ | $A_{12}$ | $A_{14}$ | $A_{16}$ |
|---|---|---|---|---|---|---|---|
| S7 | 2.3114E−02 | 3.3050E−04 | 4.1368E−04 | 3.1198E−05 | 1.0790E−05 | 2.2900E−06 | 5.7311E−07 |
| S8 | 1.1800E−02 | 1.5931E−03 | −1.9940E−04 | 1.1745E−04 | −1.9247E−05 | 5.6953E−06 | −9.5252E−07 |
| S9 | −2.8261E−02 | −8.8644E−04 | −4.2355E−04 | 2.1381E−05 | −3.2917E−05 | 3.2132E−06 | −1.8012E−06 |
| S10 | −4.1221E−02 | 3.0992E−03 | −3.5945E−04 | 9.6986E−05 | −1.5099E−05 | 2.1554E−06 | 9.6956E−09 |
| S11 | −8.1268E−02 | −1.9131E−03 | 5.9959E−03 | 5.5451E−03 | 2.2541E−03 | 5.9284E−04 | 6.5086E−05 |
| S12 | −3.8045E−01 | 3.6418E−04 | 8.3276E−03 | 7.4385E−03 | 4.0333E−03 | 1.7458E−03 | 4.8163E−04 |
| S13 | −5.5313E−01 | 3.2217E−02 | 1.8745E−02 | −1.0481E−03 | −1.8025E−03 | −4.6169E−04 | −2.5833E−04 |
| S14 | 1.6165E−01 | 1.1862E−01 | −2.2065E−02 | −8.0015E−03 | 5.6767E−03 | 4.3231E−04 | −9.0543E−05 |
| S15 | 1.6728E+00 | −2.1700E−01 | 2.9456E−02 | 3.7565E−03 | −4.6928E−03 | −3.9816E−05 | 1.2082E−03 |

In this example, a total effective focal length fx of the optical imaging lens group in the X-axis direction is 4.20 mm, and a total effective focal length fy of the optical imaging lens group in the Y-axis direction is 3.15 mm. A total track length TTL of the optical imaging lens group is 7.78 mm. Half of a diagonal length ImgH of an effective pixel area on the image plane S19 of the optical imaging lens group is 3.40 mm. A maximal field-of-view FOV of the optical imaging lens group is 86.6°. An f-number Fnoy of the optical imaging lens group in the Y-axis direction is 2.54, and an f-number Fnox of the optical imaging lens group in the X-axis direction is 2.81.

Table 13 is a table showing basic parameters of the optical imaging lens group in Embodiment 5. Here, the units of a radius of curvature, a thickness/distance, a focal length Y and a focal length X are millimeters (mm). Tables 14-1 and 14-2 show the high-order coefficients applicable to the rotationally symmetric aspheric surfaces in Embodiment 5. Here, the surface type of each rotationally symmetric aspheric surface may be defined using the formula (1) given in Embodiment 1. Tables 15-1 to 15-3 show the Zernike polynomial coefficients applicable to the non-rotationally symmetric aspheric surfaces in Embodiment 5. Here, the surface type of a non-rotationally symmetric aspheric surface may be defined using the formulas (2) and (3) given in Embodiment 1.

TABLE 13

| surface | surface | radius of curvature | thickness distance | refractive index | material abbe number | focal length Y | focal length X | conic coefficient |
|---|---|---|---|---|---|---|---|---|
| OBJ | spherical | infinite | infinite | | | | | |
| S1(AAS) | aspheric | 24.516 | 0.2500 | 1.55 | 56.1 | −6.26 | −129.82 | −44.7137 |
| S2(AAS) | aspheric | 1.9207 | 0.5921 | | | | | −0.4776 |
| S3(AAS) | aspheric | −150.2212 | 1.1067 | 1.67 | 19.2 | −48.04 | 48.51 | −99.0000 |
| S4(AAS) | aspheric | 61.9148 | 0.5145 | | | | | −97.6640 |
| S5(AAS) | aspheric | 5.9590 | 0.3366 | 1.65 | 23.5 | 24.68 | −7.56 | −15.1527 |
| S6(AAS) | aspheric | 0.526 | 0.2864 | | | | | −0.8717 |
| S7 | aspheric | 2.0618 | 0.3807 | 1.55 | 56.1 | 2.60 | | 1.1994 |
| S8 | aspheric | −4.276 | 0.0400 | | | | | −81.7622 |
| STO | spherical | infinite | 0.0400 | | | | | |
| S9 | aspheric | 1.9728 | 0.4066 | 1.67 | 19.2 | −6.54 | | −0.8687 |
| S10 | aspheric | 1.2512 | 0.4488 | | | | | −0.6325 |
| S11 | aspheric | 11.8270 | 0.5749 | 1.55 | 56.1 | 8.92 | | −98.9275 |
| S12 | aspheric | −8.1345 | 0.3025 | | | | | 48.2278 |
| S13 | aspheric | 300.0000 | 0.5092 | 1.55 | 56.1 | 4.30 | | −97.8401 |
| S14 | aspheric | −2.3639 | 0.8021 | | | | | 0.0636 |
| S15 | aspheric | −0.8388 | 0.4094 | 1.54 | 55.9 | −3.82 | −2.05 | −1.0513 |
| S16(AAS) | aspheric | −5.5859 | 0.0400 | | | | | 0.0000 |
| S17 | spherical | infinite | 0.2100 | 1.52 | 64.2 | | | |
| S18 | spherical | infinite | 0.5295 | | | | | |
| S19 | spherical | infinite | | | | | | |

TABLE 14-2

| surface number | $A_{18}$ | $A_{20}$ | $A_{22}$ | $A_{24}$ | $A_{26}$ | $A_{28}$ |
|---|---|---|---|---|---|---|
| S7  | 0.0000E+00  | 0.0000E+00  | 0.0000E+00 | 0.0000E+00  | 0.0000E+00 | 0.0000E+00 |
| S8  | 0.0000E+00  | 0.0000E+00  | 0.0000E+00 | 0.0000E+00  | 0.0000E+00 | 0.0000E+00 |
| S9  | 0.0000E+00  | 0.0000E+00  | 0.0000E+00 | 0.0000E+00  | 0.0000E+00 | 0.0000E+00 |
| S10 | 0.0000E+00  | 0.0000E+00  | 0.0000E+00 | 0.0000E+00  | 0.0000E+00 | 0.0000E+00 |
| S11 | 0.0000E+00  | 0.0000E+00  | 0.0000E+00 | 0.0000E+00  | 0.0000E+00 | 0.0000E+00 |
| S12 | 9.3480E−05  | 0.0000E+00  | 0.0000E+00 | 0.0000E+00  | 0.0000E+00 | 0.0000E+00 |
| S13 | −6.3619E−06 | 9.5651E−05  | 4.9234E−05 | 0.0000E+00  | 0.0000E+00 | 0.0000E+00 |
| S14 | 9.5243E−04  | 3.6476E−04  | 7.8020E−05 | 1.6352E−04  | 1.0784E−04 | 0.0000E+00 |
| S15 | −3.1957E−04 | −1.5795E−04 | 1.2247E−04 | −3.7537E−05 | 2.9531E−07 | 3.2845E−06 |

TABLE 15-1

| AAS surface | $C_2$ | $C_5$ | $C_6$ | $C_{12}$ | $C_{13}$ | $C_{14}$ | $C_{23}$ |
|---|---|---|---|---|---|---|---|
| S1  | −9.5253E−03 | −4.5726E−02 | 4.0120E−04  | 3.5707E−02  | −1.4026E−02 | 4.4003E−03  | 7.1383E−03 |
| S2  | −3.4932E−01 | −2.7452E−01 | −3.6190E−01 | 2.6153E−02  | −2.4450E−02 | −1.2333E−02 | −5.4062E−03 |
| S3  | 2.7118E−02  | −8.4427E−02 | 3.2184E−02  | −3.9515E−02 | 6.9062E−03  | 9.1352E−03  | −4.1687E−03 |
| S4  | 7.7836E−03  | −1.2210E−01 | 1.3279E−02  | −2.3914E−02 | −1.2197E−02 | 1.1359E−02  | 4.6103E−03 |
| S5  | −3.5955E−01 | −8.7819E−02 | −4.3521E−02 | −3.4201E−04 | −1.9832E−02 | 8.4380E−03  | 4.9072E−03 |
| S6  | −3.1544E−01 | 2.9859E−02  | −5.6560E−01 | 2.0895E−03  | −3.5392E−03 | −3.6480E−02 | 4.3203E−04 |
| S16 | −3.2556E−03 | 1.4087E−02  | 6.1357E−04  | −2.5108E−02 | −1.9931E−01 | −8.0453E−02 | 1.7226E−03 |

TABLE 15-2

| AAS surface | $C_{24}$ | $C_5$ | $C_{26}$ | $C_{38}$ | $C_{39}$ | $C_{40}$ | $C_{41}$ |
|---|---|---|---|---|---|---|---|
| S1  | −5.1372E−03 | 1.7692E−03  | −4.7862E−03 | 2.6345E−03  | 3.9220E−05  | −1.0148E−03 | −7.4797E−04 |
| S2  | 5.3855E−03  | −5.3993E−03 | 3.7445E−04  | 7.4001E−04  | −6.7009E−04 | 7.3148E−04  | −6.7457E−04 |
| S3  | 3.9903E−03  | −2.2826E−03 | 3.5532E−03  | −1.7478E−03 | −3.8757E−04 | 4.5070E−04  | 8.6293E−04 |
| S4  | 3.3650E−03  | −5.9697E−03 | 6.1982E−03  | −3.0347E−03 | 3.7470E−04  | 4.0419E−04  | −1.6188E−04 |
| S5  | 3.1406E−03  | −3.8120E−03 | 6.9507E−03  | −1.4127E−03 | 5.9082E−04  | 5.3424E−04  | −4.4214E−05 |
| S6  | 4.2081E−04  | −1.5078E−04 | −3.1491E−03 | 8.9021E−05  | 1.7303E−04  | 1.2065E−04  | −9.5247E−05 |
| S16 | −4.2609E−02 | −2.9772E−02 | −5.4725E−02 | 6.2983E−03  | −1.8017E−02 | −1.0948E−02 | −7.3760E−03 |

TABLE 15-3

| AAS surface | $C_{42}$ | $C_{57}$ | $C_{58}$ | $C_{59}$ | $C_{60}$ | $C_{61}$ | $C_{62}$ |
|---|---|---|---|---|---|---|---|
| S1  | 4.91113E−04 | 4.7216E−04  | −1.9693E−04 | 9.1444E−05  | 1.5148E−05  | −1.1895E−04 | −2.4884E−04 |
| S2  | 2.3916E−04  | −4.0518E−04 | 3.8661E−04  | −4.0522E−04 | 3.8883E−04  | −4.0447E−04 | 1.0535E−04 |
| S3  | −2.7176E−04 | 1.1083E−04  | −5.7910E−05 | −2.0521E−04 | 4.0290E−05  | −9.5264E−05 | 2.4415E−04 |
| S4  | 5.7878E−04  | 5.1575E−04  | −1.6318E−04 | −3.1954E−05 | −3.3294E−05 | −1.2158E−04 | 2.4460E−04 |
| S5  | 7.85581E−06 | 3.2929E−04  | 6.5073E−05  | 5.0154E−05  | −1.9515E−06 | 2.5919E−06  | −6.8671E−05 |
| S6  | −8.2778E−04 | 3.8157E−05  | 4.1187E−05  | 3.4180E−05  | 1.7503E−05  | −1.0011E−05 | −2.7478E−04 |
| S16 | 2.3188E−02  | −9.1763E−04 | −1.5932E−02 | −4.0050E−03 | −2.6791E−03 | 6.9852E−03  | −6.4094E−03 |

Figure 10:
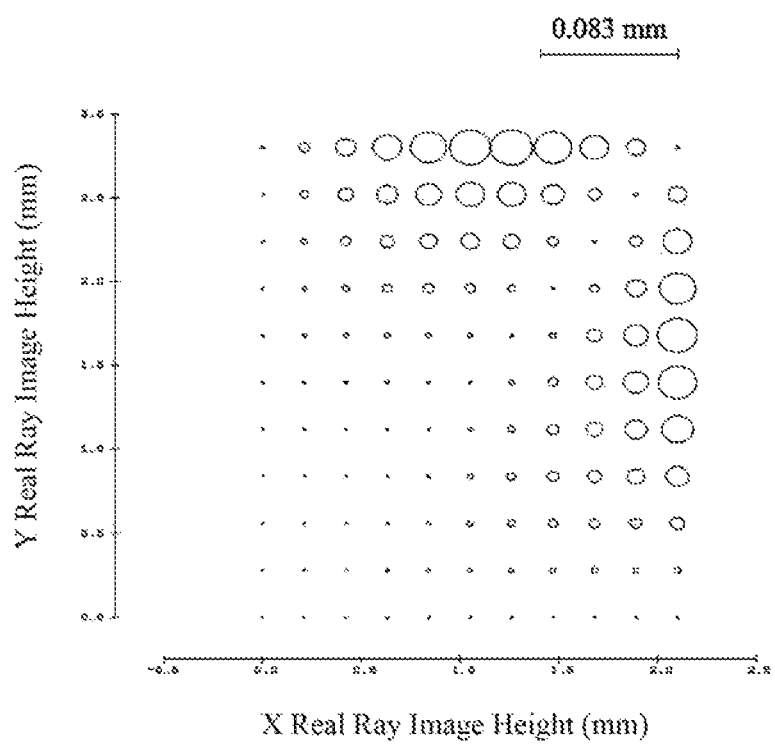
FIG. 10 schematically illustrates a situation of an RMS spot diameter of the optical imaging lens group according to Embodiment 5 of the present disclosure in a first quadrant.

FIG. 10 illustrates a size of an RMS spot diameter of the optical imaging lens group of Embodiment 5 at a different image height in a first quadrant. FIG. 10 illustrates a relationship between the RMS spot diameter and a real ray image height. In FIG. 10, each grid of a coordinate axis corresponds to 0.083 mm, a minimal RMS spot diameter is 0.001478 mm, a maximal RMS spot diameter is 0.029241 mm, an average value of RMS spot diameters is 0.007468 mm, and a standard deviation of the RMS spot diameter is 0.0072204 mm. It can be seen from FIG. 10 that the optical imaging lens group given in Embodiment 5 can achieve a good imaging quality.

Embodiment 6

Figure 11:
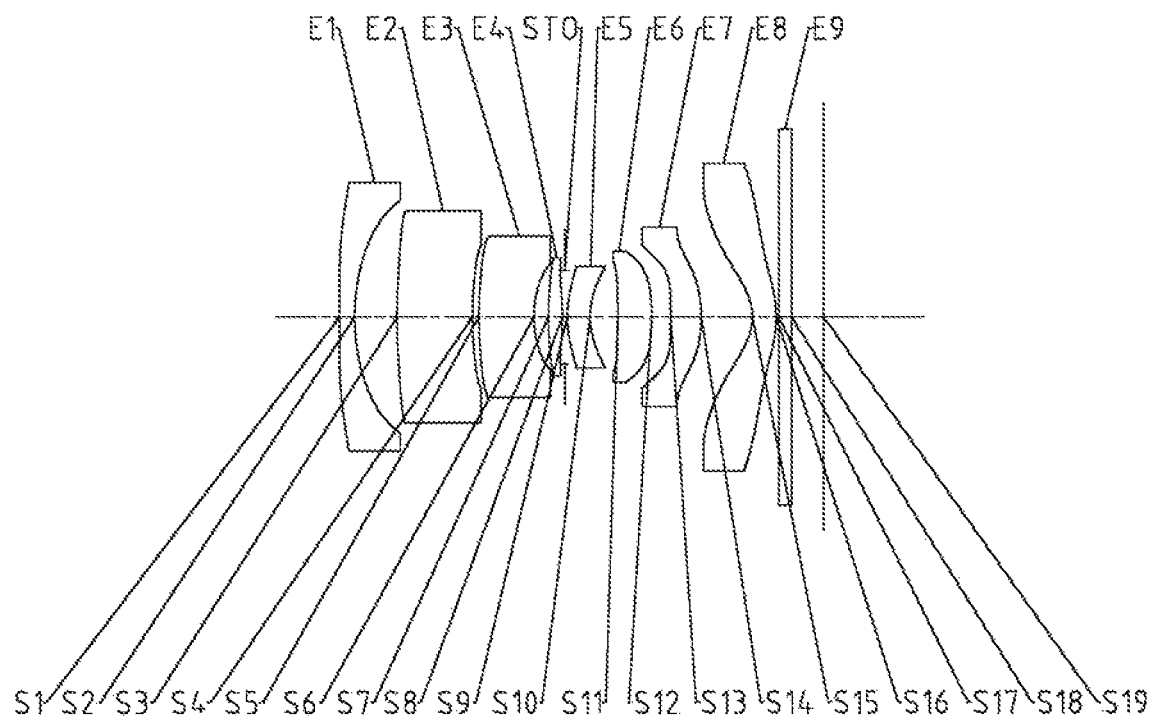
FIG. 11 is a schematic structural diagram of an optical imaging lens group according to Embodiment 6 of the present disclosure.

An optical imaging lens group according to Embodiment 6 of the present disclosure is described below with reference to FIGS. 11 and 12. FIG. 11 is a schematic structural diagram of the optical imaging lens group according to Embodiment 6 of the present disclosure.

As shown in FIG. 11, the optical imaging lens group includes, sequentially from an object side to an image side, a first lens E1, a second lens E2, a third lens E3, a fourth lens E4, a diaphragm STO, a fifth lens E5, a sixth lens E6, a seventh lens E7, an eighth lens E8, an optical filter E9 and an image plane S19.

The first lens E1 has a negative refractive power in a Y-axis direction of the optical imaging lens group and a negative refractive power in an X-axis direction of the optical imaging lens group. An object-side surface S1 of the first lens E1 is a convex surface, and an image-side surface S2 of the first lens E1 is a concave surface. The second lens E2 has a negative refractive power in the Y-axis direction of the optical imaging lens group and a positive refractive power in the X-axis direction of the optical imaging lens group. An object-side surface S3 of the second lens E2 is a concave surface, and an image-side surface S4 of the second lens E2 is a concave surface. The third lens E3 has a positive refractive power in the Y-axis direction of the optical imaging lens group and a negative refractive power in the X-axis direction of the optical imaging lens group. An object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface.

The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a concave surface, and an image-side surface S14 of the seventh lens E7 is a convex surface. The eighth lens E8 has a negative refractive power in the Y-axis direction of the optical imaging lens group and a negative refractive power in the X-axis direction of the optical imaging lens group. An object-side surface S15 of the eighth lens E8 is a concave surface, and an image-side surface S16 of the eighth lens E8 is a convex surface. The optical filter E9 has an object-side surface S17 and an image-side surface S18. Light from an object sequentially passes through the surfaces S1-S18 and finally forms an image on the image plane S19.

In this example, a total effective focal length fx of the optical imaging lens group in the X-axis direction is 4.20 mm, and a total effective focal length fy of the optical imaging lens group in the Y-axis direction is 3.15 mm. A total track length TTL of the optical imaging lens group is 7.78 mm. Half of a diagonal length ImgH of an effective pixel area on the image plane S19 of the optical imaging lens group is 3.40 mm. A maximal field-of-view FOV of the optical imaging lens group is 87.1°. An f-number Fnoy of the optical imaging lens group in the Y-axis direction is 2.56, and an f-number Fnox of the optical imaging lens group in the X-axis direction is 2.83.

Table 16 is a table showing basic parameters of the optical imaging lens group in Embodiment 6. Here, the units of a radius of curvature, a thickness/distance, a focal length Y and a focal length X are millimeters (mm). Tables 17-1 and 17-2 show the high-order coefficients applicable to the rotationally symmetric aspheric surfaces in Embodiment 6. Here, the surface type of each rotationally symmetric aspheric surface may be defined using the formula (1) given in Embodiment 1. Tables 18-1 to 18-3 show the Zernike polynomial coefficients applicable to the non-rotationally symmetric aspheric surfaces in Embodiment 6. Here, the surface type of a non-rotationally symmetric aspheric surface may be defined using the formulas (2) and (3) given in Embodiment 1.

TABLE 16

| surface number | surface type | radius of curvature | thickness/ distance | refractive index | abbe number | focal length Y | focal length X | conic coefficient |
|---|---|---|---|---|---|---|---|---|
| OBJ | spherical | infinite | infinite | | | | | |
| S1(AAS) | aspheric | 26.567 | 0.2500 | 1.55 | 56.1 | −6.06 | −525.92 | −47.9726 |
| S2(AAS) | aspheric | 1.9304 | 0.5837 | | | | | −0.4776 |
| S3(AAS) | aspheric | −113.1267 | 1.3472 | 1.67 | 19.2 | −46.28 | 17.40 | −99.0000 |
| S4(AAS) | aspheric | 150.1854 | 0.5066 | | | | | −81.1446 |
| S5(AAS) | aspheric | 5.6888 | 0.1524 | 1.65 | 23.5 | 29.59 | −5.22 | −17.0195 |
| S6(AAS) | aspheric | 0.520 | 0.2468 | | | | | −0.8753 |
| S7 | aspheric | 1.9503 | 0.3939 | 1.55 | 56.1 | 2.51 | | 1.0993 |
| S8 | aspheric | −4.267 | 0.0400 | | | | | −61.7091 |
| STO | spherical | infinite | 0.0400 | | | | | |
| S9 | aspheric | 1.8835 | 0.3769 | 1.67 | 19.2 | −7.16 | | −0.7777 |
| S10 | aspheric | 1.2471 | 0.4554 | | | | | −0.5897 |
| S11 | aspheric | −90.0539 | 0.5564 | 1.55 | 56.1 | 10.44 | | 99.0000 |
| S12 | aspheric | −5.3728 | 0.3146 | | | | | 18.9284 |
| S13 | aspheric | −69.2878 | 0.5029 | 1.55 | 56.1 | 4.21 | | −73.9422 |
| S14 | aspheric | −2.2323 | 0.8397 | | | | | 0.0327 |
| S15 | aspheric | −0.8462 | 0.3940 | 1.54 | 55.9 | −3.57 | −2.01 | −1.0784 |
| S16(AAS) | aspheric | −5.9045 | 0.0400 | | | | | 0.0000 |
| S17 | spherical | infinite | 0.2100 | 1.52 | 64.2 | | | |
| S18 | spherical | infinite | 0.5295 | | | | | |
| S19 | spherical | infinite | | | | | | |

TABLE 17-1

| surface number | $A_4$ | $A_6$ | $A_8$ | $A_{10}$ | $A_{12}$ | $A_{14}$ | $A_{16}$ |
|---|---|---|---|---|---|---|---|
| S7 | 2.1812E−02 | 7.6096E−04 | 4.1072E−04 | 3.2589E−05 | 1.1794E−05 | 2.6963E−06 | 2.1674E−07 |
| S8 | 1.1832E−02 | 1.8726E−03 | −1.7923E−04 | 1.0991E−04 | −1.9332E−05 | 5.6647E−06 | −1.0041E−06 |
| S9 | −2.7529E−02 | −1.1169E−03 | −6.4791E−04 | 2.6795E−05 | −4.9559E−05 | 3.7129E−06 | −3.9054E−06 |
| S10 | −3.9772E−02 | 2.8063E−03 | −3.8081E−04 | 1.0832E−04 | −1.5646E−05 | 2.6651E−06 | −2.5340E−07 |
| S11 | −9.9800E−02 | 2.5370E−06 | 7.3638E−03 | 5.8766E−03 | 2.4698E−03 | 6.8777E−04 | 9.5513E−05 |
| S12 | −3.6925E−01 | −3.1583E−03 | 9.5205E−03 | 9.2721E−03 | 5.2960E−03 | 2.2929E−03 | 6.5951E−04 |

TABLE 17-1-continued

| surface number | $A_4$ | $A_6$ | $A_8$ | $A_{10}$ | $A_{12}$ | $A_{14}$ | $A_{16}$ |
|---|---|---|---|---|---|---|---|
| S13 | −5.4022E−01 | 2.8164E−02 | 1.7794E−02 | −6.5082E−04 | −1.7459E−03 | −5.8871E−04 | −2.4910E−04 |
| S14 | 1.6794E−01 | 1.1469E−01 | −1.6664E−02 | −7.8722E−03 | 4.7001E−03 | 6.0850E−04 | 1.0553E−04 |
| S15 | 1.6205E+00 | −2.2192E−01 | 3.0292E−02 | 3.8906E−03 | −4.2066E−03 | −1.2508E−04 | 1.0071E−03 |

TABLE 17-2

| surface number | $A_{18}$ | $A_{20}$ | $A_{22}$ | $A_{24}$ | $A_{26}$ | $A_{28}$ |
|---|---|---|---|---|---|---|
| S7 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 | 0.0000E+00 |
| S12 | 1.2502E−04 | 0.0000E+00 | 0.0000E+00 | 0.0000E+00 | 0.0000E+00 | 0.0000E+00 |
| S13 | 4.7613E−05 | 1.1442E−04 | 4.9868E−05 | 0.0000E+00 | 0.0000E+00 | 0.0000E+00 |
| S14 | 8.9075E−04 | 3.5738E−04 | 1.0957E−04 | 1.6390E−04 | 9.9092E−05 | 0.0000E+00 |
| S15 | −2.5992E−04 | −1.2033E−04 | 1.0562E−04 | −3.3955E−05 | 2.9306E−06 | 6.1381E−07 |

TABLE 18-1

| AAS surface | $C_2$ | $C_5$ | $C_6$ | $C_{12}$ | $C_{13}$ | $C_{14}$ | $C_{23}$ |
|---|---|---|---|---|---|---|---|
| S1 | −9.5405E−03 | −2.8648E−02 | −1.5917E−05 | 3.7915E−02 | −1.6441E−02 | 4.2953E−03 | 6.8577E−03 |
| S2 | −3.4932E−01 | −2.7452E−01 | −3.6190E−01 | 2.6153E−02 | −2.4450E−02 | −1.2333E−02 | −5.4062E−03 |
| S3 | 2.7084E−02 | −9.1564E−02 | 3.2456E−02 | −3.8373E−02 | 6.6835E−03 | 9.0171E−03 | −3.7748E−03 |
| S4 | 5.8014E−03 | −1.4253E−01 | 1.3384E−02 | −2.7670E−02 | −9.8217E−03 | 1.2293E−02 | 5.9631E−03 |
| S5 | −3.5368E−01 | −1.2207E−01 | −4.3909E−02 | −2.5926E−03 | −1.6975E−02 | 8.9039E−03 | 5.5632E−03 |
| S6 | −3.2240E−01 | 1.9423E−02 | −5.6370E−01 | 3.2943E−03 | −4.3950E−03 | −3.7934E−02 | 5.8948E−04 |
| S16 | −2.7474E−03 | 1.9577E−02 | 1.5834E−03 | −2.3581E−02 | −1.9706E−01 | −7.5431E−02 | 1.5077E−03 |

TABLE 18-2

| AAS surface | $C_{24}$ | $C_{25}$ | $C_{26}$ | $C_{38}$ | $C_{39}$ | $C_{40}$ | $C_{41}$ |
|---|---|---|---|---|---|---|---|
| S1 | −5.6879E−03 | 1.6381E−03 | −4.5011E−03 | 2.7349E−03 | −2.4319E−04 | −1.0055E−03 | −6.7389E−04 |
| S2 | 5.3855E−03 | −5.3993E−03 | 3.7445E−04 | 7.4001E−04 | −6.7009E−04 | 7.3148E−04 | −6.7457E−04 |
| S3 | 4.0296E−03 | −2.2680E−03 | 3.1763E−03 | −1.2537E−03 | −2.6869E−04 | 4.3691E−04 | 6.5229E−04 |
| S4 | 2.0964E−03 | −4.8685E−03 | 5.0793E−03 | −1.9529E−03 | 3.1013E−04 | 1.8029E−04 | 1.1761E−04 |
| S5 | 2.6791E−03 | −2.7362E−03 | 5.8044E−03 | −9.2927E−04 | 4.3256E−04 | 5.4355E−04 | 1.8164E−04 |
| S6 | 5.7192E−04 | −1.3026E−04 | −4.2046E−03 | 2.9441E−05 | 1.8168E−04 | 1.7064E−04 | −9.9176E−05 |
| S16 | −4.4997E−02 | −3.7657E−02 | −5.6440E−02 | 1.4311E−02 | −1.8041E−02 | −1.2519E−02 | −1.2861E−02 |

TABLE 18-3

| AAS surface | $C_{42}$ | $C_{57}$ | $C_{58}$ | $C_{59}$ | $C_{60}$ | $C_{61}$ | $C_{62}$ |
|---|---|---|---|---|---|---|---|
| S1 | 4.9048E−04 | 4.6472E−04 | −2.9395E−04 | −1.1097E−06 | −4.7095E−05 | −1.4624E−04 | −2.3772E−04 |
| S2 | 2.3916E−04 | −4.0518E−04 | 3.8661E−04 | −4.0522E−04 | 3.8883E−04 | −4.0447E−04 | 1.0535E−04 |
| S3 | −2.5406E−04 | 5.4586E−05 | −1.5625E−05 | −1.0801E−04 | 7.8980E−05 | −3.7228E−05 | 2.1453E−04 |
| S4 | 5.7002E−04 | 4.3107E−04 | −6.6960E−05 | 2.2127E−05 | −4.9391E−05 | −2.3736E−05 | 2.0181E−04 |
| S5 | −4.8457E−05 | 4.2885E−04 | 1.0502E−04 | 6.6086E−05 | 1.1803E−05 | 8.2510E−05 | −9.7033E−05 |
| S6 | −1.1308E−03 | 8.0776E−05 | 4.3468E−05 | 3.5230E−05 | 2.1915E−05 | 2.3153E−06 | −3.2211E−04 |
| S16 | 1.8916E−02 | −6.2728E−04 | −1.5202E−02 | −4.5314E−03 | −3.0867E−03 | 3.8427E−03 | −4.4062E−03 |

Figure 12:
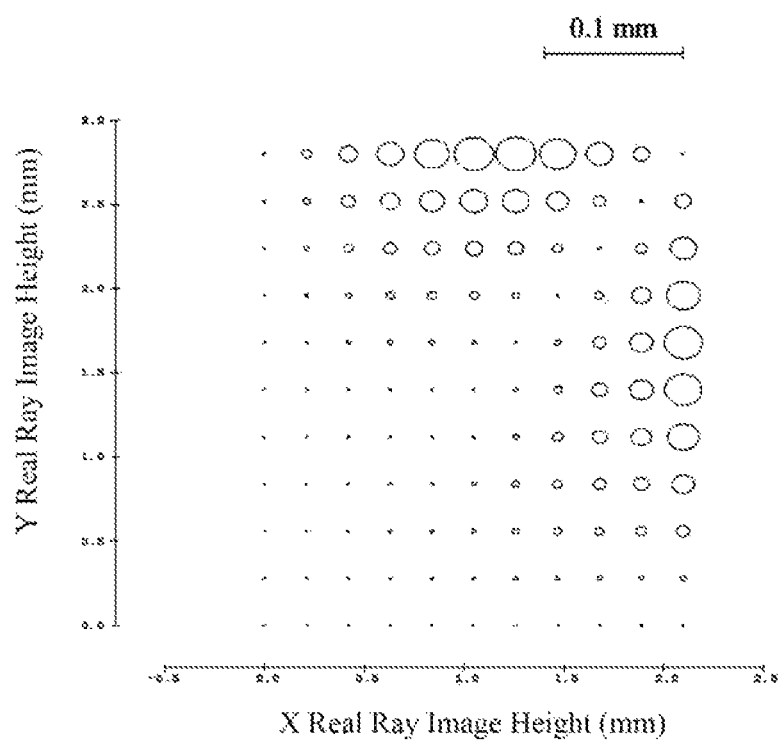
FIG. 12 schematically illustrates a situation of an RMS spot diameter of the optical imaging lens group according to Embodiment 6 of the present disclosure in a first quadrant.

FIG. 12 illustrates a size of an RMS spot diameter of the optical imaging lens group of Embodiment 6 at a different image height in a first quadrant. FIG. 12 illustrates a relationship between the RMS spot diameter and a real ray image height. In FIG. 12, each grid of a coordinate axis corresponds to 0.1 mm, a minimal RMS spot diameter is 0.0013987 mm, a maximal RMS spot diameter is 0.033559 mm, an average value of RMS spot diameters is 0.0080735 mm, and a standard deviation of the RMS spot diameter is 0.0082901 mm. It can be seen from FIG. 12 that the optical imaging lens group given in Embodiment 6 can achieve a good imaging quality.

Embodiment 7

Figure 13:
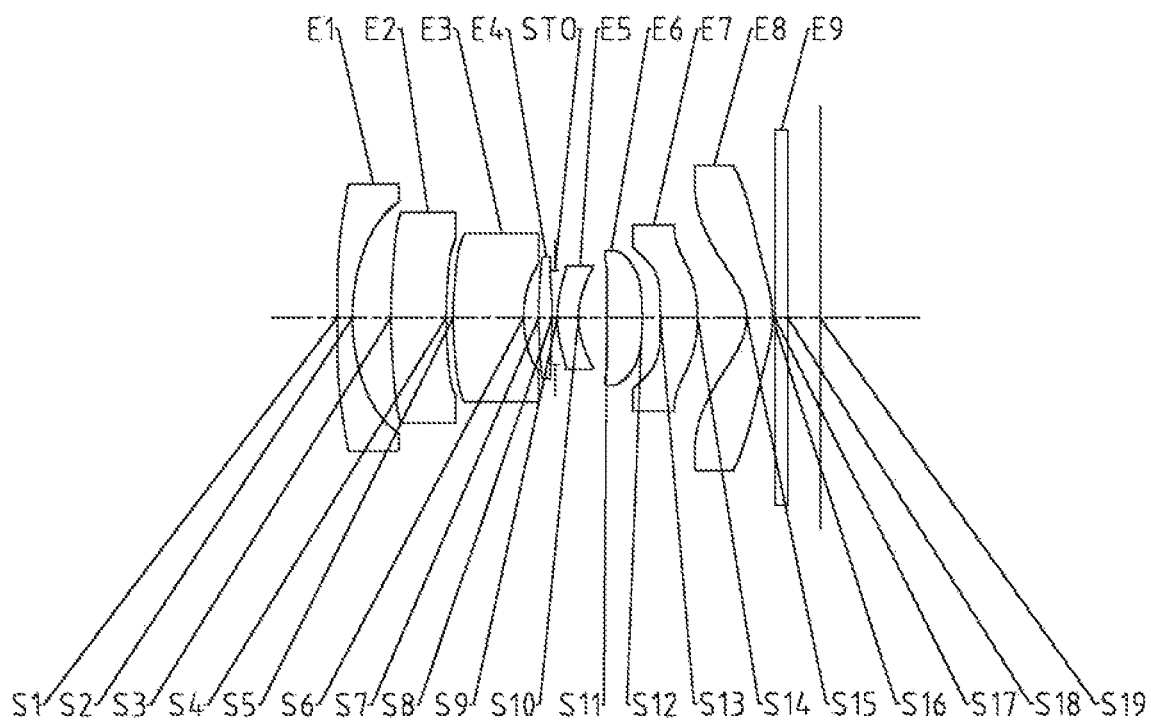
FIG. 13 is a schematic structural diagram of an optical imaging lens group according to Embodiment 7 of the present disclosure.

An optical imaging lens group according to Embodiment 7 of the present disclosure is described below with reference to FIGS. 13 and 14. FIG. 13 is a schematic structural diagram of the optical imaging lens group according to Embodiment 7 of the present disclosure.

As shown in FIG. 13, the optical imaging lens group includes, sequentially from an object side to an image side, a first lens E1, a second lens E2, a third lens E3, a fourth lens E4, a diaphragm STO, a fifth lens E5, a sixth lens E6, a seventh lens E7, an eighth lens E8, an optical filter E9 and an image plane S19.

The first lens E1 has a negative refractive power in a Y-axis direction of the optical imaging lens group and a negative refractive power in an X-axis direction of the optical imaging lens group. An object-side surface S1 of the first lens E1 is a convex surface, and an image-side surface S2 of the first lens E1 is a concave surface. The second lens E2 has a negative refractive power in the Y-axis direction of the optical imaging lens group and a positive refractive power in the X-axis direction of the optical imaging lens group. An object-side surface S3 of the second lens E2 is a concave surface, and an image-side surface S4 of the second lens E2 is a concave surface. The third lens E3 has a positive refractive power in the Y-axis direction of the optical imaging lens group and a negative refractive power in the X-axis direction of the optical imaging lens group. An object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface.

The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power in the Y-axis direction of the optical imaging lens group and a negative refractive power in the X-axis direction of the optical imaging lens group. An object-side surface S15 of the eighth lens E8 is a concave surface, and an image-side surface S16 of the eighth lens E8 is a convex surface. The optical filter E9 has an object-side surface S17 and an image-side surface S18. Light from an object sequentially passes through the surfaces S1-S18 and finally forms an image on the image plane S19.

In this example, a total effective focal length fx of the optical imaging lens group in the X-axis direction is 4.26 mm, and a total effective focal length fy of the optical imaging lens group in the Y-axis direction is 3.28 mm. A total track length TTL of the optical imaging lens group is 7.78 mm. Half of a diagonal length ImgH of an effective pixel area on the image plane S19 of the optical imaging lens group is 3.40 mm. A maximal field-of-view FOV of the optical imaging lens group is 87.06°. An f-number Fnoy of the optical imaging lens group in the Y-axis direction is 2.59, and an f-number Fnox of the optical imaging lens group in the X-axis direction is 2.84.

Table 19 is a table showing basic parameters of the optical imaging lens group in Embodiment 7. Here, the units of a radius of curvature, a thickness/distance, a focal length Y and a focal length X are millimeters (mm). Tables 20-1 and 20-2 show the high-order coefficients applicable to the rotationally symmetric aspheric surfaces in Embodiment 7. Here, the surface type of each rotationally symmetric aspheric surface may be defined using the formula (1) given in Embodiment 1. Tables 21-1 to 21-3 show the Zernike polynomial coefficients applicable to the non-rotationally symmetric aspheric surfaces in Embodiment 7. Here, the surface type of a non-rotationally symmetric aspheric surface may be defined using the formulas (2) and (3) given in Embodiment 1.

TABLE 19

| surface number | surface type | radius of curvature | thickness/ distance | refractive index | abbe number | focal length Y | focal length X | conic coefficient |
|---|---|---|---|---|---|---|---|---|
| OBJ | spherical | infinite | infinite | | | | | |
| S1(AAS) | aspheric | 22.124 | 0.2500 | 1.55 | 56.1 | −6.48 | −82.92 | −41.6716 |
| S2(AAS) | aspheric | 1.9008 | 0.5620 | | | | | −0.4776 |
| S3(AAS) | aspheric | −700.0000 | 1.0250 | 1.67 | 19.2 | −47.36 | 47.26 | −99.0000 |
| S4(AAS) | aspheric | 29.2598 | 0.5146 | | | | | 19.5256 |
| S5(AAS) | aspheric | 5.4736 | 0.3517 | 1.65 | 23.5 | 21.02 | −8.31 | −14.6671 |
| S6(AAS) | aspheric | 0.527 | 0.2920 | | | | | −0.8701 |
| S7 | aspheric | 2.1062 | 0.3848 | 1.55 | 56.1 | 2.64 | | 1.0927 |
| S8 | aspheric | −4.268 | 0.0400 | | | | | −74.3695 |
| STO | spherical | infinite | 0.0400 | | | | | |
| S9 | aspheric | 1.9057 | 0.3472 | 1.67 | 19.2 | −6.64 | | −0.8627 |
| S10 | aspheric | 1.2400 | 0.4678 | | | | | −0.6424 |
| S11 | aspheric | 13.5122 | 0.5834 | 1.55 | 56.1 | 9.08 | | −99.0000 |
| S12 | aspheric | −7.7139 | 0.2954 | | | | | 40.3866 |
| S13 | aspheric | 300.0000 | 0.6147 | 1.55 | 56.1 | 4.38 | | 99.0000 |
| S14 | aspheric | −2.4102 | 0.8057 | | | | | 0.1213 |
| S15 | aspheric | −0.8437 | 0.4261 | 1.54 | 55.9 | −3.57 | −2.04 | −1.0611 |

TABLE 19-continued

| surface number | surface type | radius of curvature | thickness/ distance | material refractive index | abbe number | focal length Y | focal length X | conic coefficient |
|---|---|---|---|---|---|---|---|---|
| S16(AAS) | aspheric | −5.2686 | 0.0400 | | | | | 0.0000 |
| S17 | spherical | infinite | 0.2100 | 1.52 | 64.2 | | | |
| S18 | spherical | infinite | 0.5295 | | | | | |
| S19 | spherical | infinite | | | | | | |

TABLE 20-1

| surface number | $A_4$ | $A_6$ | $A_8$ | $A_{10}$ | $A_{12}$ | $A_{14}$ | $A_{16}$ |
|---|---|---|---|---|---|---|---|
| S7 | 2.2341E−02 | −4.1463E−05 | 4.1971E−04 | 2.0285E−05 | 9.2262E−06 | 1.5213E−06 | 5.0363E−07 |
| S8 | 1.0578E−02 | 1.1187E−03 | −8.2669E−05 | 1.0051E−04 | −1.6223E−05 | 4.7194E−06 | −6.9194E−07 |
| S9 | −2.8233E−02 | −5.4111E−04 | −3.0261E−04 | 2.9872E−05 | −2.7924E−05 | 3.8406E−06 | −1.2396E−06 |
| S10 | −4.1560E−02 | 3.1918E−03 | −3.5797E−04 | 1.0066E−04 | −1.8078E−05 | 2.5392E−06 | −1.3326E−07 |
| S11 | −8.7537E−02 | −1.6099E−03 | 5.9127E−03 | 5.2713E−03 | 2.1082E−03 | 5.4554E−04 | 5.4785E−05 |
| S12 | −3.9933E−01 | −2.4921E−03 | 4.2648E−03 | 5.8224E−03 | 3.5580E−03 | 1.5870E−03 | 4.1815E−04 |
| S13 | −5.4176E−01 | 3.0752E−02 | 1.4458E−02 | −1.2482E−03 | −1.1297E−03 | −3.0862E−04 | −3.8174E−04 |
| S14 | 1.5375E−01 | 1.1424E−01 | −2.0062E−02 | −8.2377E−03 | 4.4080E−03 | −1.6849E−04 | −8.0299E−04 |
| S15 | 1.7242E+00 | −2.0562E−01 | 2.3272E−02 | 2.2081E−03 | −3.2876E−03 | −2.8897E−03 | 1.2481E−03 |

TABLE 20-2

| surface number | $A_{18}$ | $A_{20}$ | $A_{22}$ | $A_{24}$ | $A_{26}$ | $A_{28}$ |
|---|---|---|---|---|---|---|
| S7 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 | 0.0000E+00 |
| S12 | 7.8541E−05 | 0.0000E+00 | 0.0000E+00 | 0.0000E+00 | 0.0000E+00 | 0.0000E+00 |
| S13 | −1.2396E−04 | 4.7614E−05 | 3.7843E−05 | 0.0000E+00 | 0.0000E+00 | 0.0000E+00 |
| S14 | 3.6266E−04 | 1.2515E−04 | −1.0508E−04 | 6.9067E−06 | 5.4676E−05 | 0.0000E+00 |
| S15 | −4.2012E−04 | −1.9097E−04 | 1.3970E−04 | −3.2417E−05 | −1.1417E−05 | 1.4316E−05 |

TABLE 21-1

| AAS surface | $C_2$ | $C_5$ | $C_6$ | $C_{12}$ | $C_{13}$ | $C_{14}$ | $C_{23}$ |
|---|---|---|---|---|---|---|---|
| S1 | −9.1278E−03 | −5.7537E−02 | 3.6433E−04 | 3.1164E−02 | −1.1529E−02 | 4.0759E−03 | 7.1364E−03 |
| S2 | −3.4932E−01 | −2.7452E−01 | −3.6190E−01 | 2.6153E−02 | −2.4450E−02 | −1.2333E−02 | −5.4062E−03 |
| S3 | 3.3306E−02 | −8.7234E−02 | 3.9218E−02 | −3.5449E−02 | 6.5776E−03 | 9.7750E−03 | −3.6694E−03 |
| S4 | 7.5129E−03 | −1.2855E−01 | 1.3652E−02 | −2.2804E−02 | −1.2715E−02 | 1.1495E−02 | 5.3465E−03 |
| S5 | −3.6027E−01 | −8.9599E−02 | −4.3373E−02 | −2.9759E−04 | −2.1060E−02 | 8.2048E−03 | 5.4650E−03 |
| S6 | −3.0463E−01 | 2.9746E−02 | −5.6472E−01 | 1.7503E−03 | −3.5820E−03 | −3.6189E−02 | 3.8800E−04 |
| S16 | −5.3204E−03 | 1.7136E−02 | −1.6566E−02 | −4.5660E−02 | −2.0592E−01 | −9.4227E−02 | −1.2513E−02 |

TABLE 21-2

| AAS surface | $C_{24}$ | $C_{25}$ | $C_{26}$ | $C_{38}$ | $C_{39}$ | $C_{40}$ | $C_{41}$ |
|---|---|---|---|---|---|---|---|
| S1 | −5.4219E−03 | 1.8325E−03 | −4.4948E−03 | 2.4681E−03 | −8.2466E−06 | −1.1045E−03 | −7.4604E−04 |
| S2 | 5.3855E−03 | −5.3993E−03 | 3.7445E−04 | 7.4001E−04 | −6.7009E−04 | 7.3148E−04 | −6.7457E−04 |
| S3 | 3.2993E−03 | −2.1619E−03 | 3.2551E−03 | −1.8497E−03 | −2.2197E−04 | 4.2501E−04 | 8.2134E−04 |
| S4 | 3.0912E−03 | −5.6760E−03 | 5.4631E−03 | −3.7952E−03 | 6.1633E−04 | 4.3543E−04 | −1.4362E−05 |
| S5 | 3.0163E−03 | −3.6863E−03 | 5.9023E−03 | −1.9918E−03 | 7.0107E−04 | 5.0408E−04 | 2.6883E−05 |
| S6 | 3.8196E−04 | −1.3520E−04 | −3.6570E−03 | 4.5563E−05 | 1.4704E−04 | 1.0023E−04 | −7.6157E−05 |
| S16 | −5.2832E−02 | −3.8436E−02 | −5.5610E−02 | −2.5946E−03 | −2.2291E−02 | −1.5104E−02 | −1.0283E−02 |

TABLE 21-3

| AAS surface | $C_{42}$ | $C_{57}$ | $C_{58}$ | $C_{59}$ | $C_{60}$ | $C_{61}$ | $C_{62}$ |
|---|---|---|---|---|---|---|---|
| S1 | 7.1753E−04 | 8.7106E−05 | −2.9747E−04 | 1.3829E−05 | 6.7218E−05 | −1.9473E−04 | −2.0398E−04 |
| S2 | 2.3916E−04 | −4.0518E−04 | 3.8661E−04 | −4.0522E−04 | 3.8883E−04 | −4.0447E−04 | 1.0535E−04 |
| S3 | −4.4380E−04 | 2.4252E−04 | 1.5949E−05 | −1.5468E−04 | 3.8118E−05 | −3.6674E−05 | 1.6371E−04 |
| S4 | 2.6017E−04 | 7.0266E−04 | −1.4786E−04 | −4.1005E−06 | −2.9799E−05 | −4.8699E−05 | 1.5238E−04 |
| S5 | −6.5309E−05 | 4.7114E−04 | 8.0139E−05 | 4.8384E−05 | −1.2835E−05 | 2.3458E−05 | −9.0410E−05 |
| S6 | −9.1635E−04 | 4.2745E−05 | 3.8790E−05 | 2.7294E−05 | 1.4062E−05 | −1.0588E−05 | −3.0394E−04 |
| S16 | 2.1211E−02 | −3.0332E−03 | −1.7194E−02 | −4.9287E−03 | −3.3594E−03 | 5.8722E−03 | −6.1602E−03 |

Figure 14:
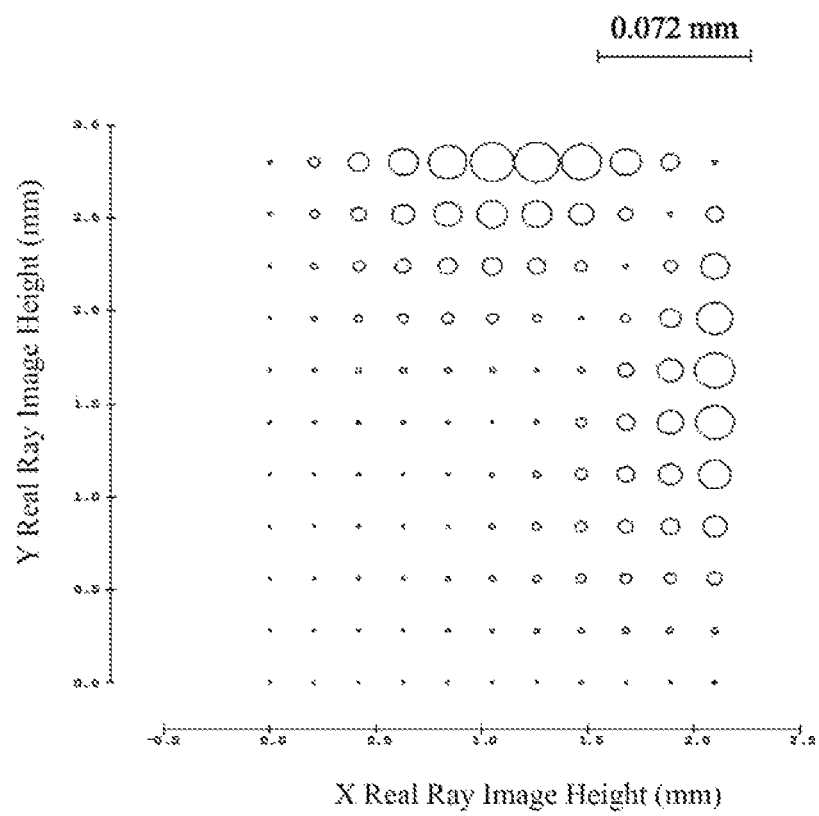
FIG. 14 schematically illustrates a situation of an RMS spot diameter of the optical imaging lens group according to Embodiment 7 of the present disclosure in a first quadrant.

FIG. 14 illustrates a size of an RMS spot diameter of the optical imaging lens group of Embodiment 7 at a different image height in a first quadrant. FIG. 14 illustrates a relationship between the RMS spot diameter and a real ray image height. In FIG. 14, each grid of a coordinate axis corresponds to 0.072 mm, a minimal RMS spot diameter is 0.001441 mm, a maximal RMS spot diameter is 0.025401 mm, an average value of RMS spot diameters is 0.0063809 mm, and a standard deviation of the RMS spot diameter is 0.0060402 mm. It can be seen from FIG. 14 that the optical imaging lens group given in Embodiment 7 can achieve a good imaging quality.

In summary, Embodiments 1-7 respectively satisfy the relationships shown in Table 22.

TABLE 22

| conditional expression | embodiment | | | | | | |
|---|---|---|---|---|---|---|---|
| | 1 | 2 | 3 | 4 | 5 | 6 | 7 |
| fy/fx | 0.75 | 0.75 | 0.75 | 0.75 | 0.75 | 0.75 | 0.77 |
| (f8x + f8y)/f1y | 0.81 | 0.74 | 0.90 | 0.93 | 0.94 | 0.92 | 0.87 |
| (f4 + f7)/f5 | −0.90 | −0.90 | −1.11 | −1.18 | −1.06 | −0.94 | −1.06 |
| f3y/(f3y + f3x) | 0.55 | 0.55 | 1.25 | 1.22 | 1.44 | 1.21 | 1.65 |
| Fnox/Fnoy | 1.11 | 1.11 | 1.11 | 1.11 | 1.11 | 1.10 | 1.10 |
| (R5 + R6)/(R1 + R2) | 0.75 | 0.66 | 0.36 | 0.32 | 0.25 | 0.22 | 0.25 |
| (R9 + R10)/(R7 − R8) | 0.31 | 0.25 | 0.33 | 0.44 | 0.51 | 0.50 | 0.49 |
| R14/(R16 − R15) | 0.44 | 0.52 | 0.56 | 0.48 | 0.50 | 0.44 | 0.54 |
| DT21/DT81 | 0.71 | 0.73 | 0.83 | 0.84 | 0.85 | 0.84 | 0.85 |
| ET6/ET5 | 0.47 | 0.36 | 0.37 | 0.37 | 0.37 | 0.49 | 0.53 |
| DT52/DT32 | 0.77 | 0.77 | 0.78 | 0.81 | 0.83 | 0.85 | 0.83 |
| (CT2 + CT3)/(CT4 + CT5) | 1.51 | 1.41 | 1.67 | 1.73 | 1.83 | 1.95 | 1.88 |
| CT7/(CT6 + CT8) | 0.65 | 0.71 | 0.62 | 0.54 | 0.52 | 0.53 | 0.61 |
| Fnox − fx/fy | 1.55 | 1.52 | 1.51 | 1.50 | 1.48 | 1.49 | 1.54 |
| \|f3x/f3y\| | −0.81 | −0.81 | −0.20 | −0.18 | −0.31 | −0.18 | −0.40 |
| Fnoy/fy | 0.82 | 0.82 | 0.81 | 0.81 | 0.81 | 0.81 | 0.79 |

The present disclosure further provides an imaging apparatus having an electronic photosensitive element which may be a charge coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens group described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features.

The inventive scope should also cover other technical solutions formed by any combination of the above technical features or equivalent features thereof without departing from the concept of the invention, for example, technical solutions formed by replacing the features as disclosed in the present disclosure with (but not limited to)

What is claimed is:

1. An optical imaging lens group, comprising, sequentially along an optical axis from an object side to an image side: a first lens, a second lens, a third lens, a fourth lens, a fifth lens, a sixth lens, a seventh lens and an eighth lens, wherein the first lens, the second lens, the third lens, the fourth lens, the fifth lens, the sixth lens, the seventh lens and the eighth lens have refractive powers, wherein at least one lens in the first lens to the eighth lens has a non-rotationally symmetric aspheric surface;

the seventh lens has a positive refractive power, and an image-side surface of the seventh lens is a convex surface;

a total effective focal length fy of the optical imaging lens group in a Y-axis direction and a total effective focal length fx of the optical imaging lens group in an X-axis direction satisfy: fy/fx<0.8; and an f-number Fnoy of the optical imaging lens group in the Y-axis direction satisfies: Fnoy<2.9.

2. The optical imaging lens group according to claim 1, wherein an f-number Fnox of the optical imaging lens group in the X-axis direction satisfies: Fnox<3.0.

3. The optical imaging lens group according to claim 1, wherein an effective focal length f1y of the first lens in the Y-axis direction of the optical imaging lens group, an effective focal length f8y of the eighth lens in the Y-axis direction of the optical imaging lens group and an effective focal length f8x of the eighth lens in the X-axis direction of the optical imaging lens group satisfy: 0.5<(f8x+f8y)/f1y<1.5.

4. The optical imaging lens group according to claim 1, wherein an effective focal length f4 of the fourth lens in the Y-axis direction of the optical imaging lens group, an effective focal length f5 of the fifth lens in the Y-axis direction of the optical imaging lens group and an effective focal length f7 of the seventh lens in the Y-axis direction of the optical imaging lens group satisfy:−1.5<(f4+f7)/f5<−0.5.

5. The optical imaging lens group according to claim 1, wherein an effective focal length f3y of the third lens in the Y-axis direction of the optical imaging lens group and an effective focal length f3x of the third lens in the X-axis direction of the optical imaging lens group satisfy: 0.5<f3y/(f3y+f3x)<2.0.

6. The optical imaging lens group according to claim 1, wherein a radius of curvature R1 of an object-side surface of the first lens, a radius of curvature R2 of an image-side surface of the first lens, a radius of curvature R5 of an object-side surface of the third lens and a radius of curvature R6 of an image-side surface of the third lens satisfy: 0<(R5+R6)/(R1+R2)<1.0.

7. The optical imaging lens group according to claim 1, wherein a radius of curvature R7 of an object-side surface of the fourth lens, a radius of curvature R8 of an image-side surface of the fourth lens, a radius of curvature R9 of an object-side surface of the fifth lens and a radius of curvature R10 of an image-side surface of the fifth lens satisfy: 0<(R9+R10)/(R7−R8)<1.0.

8. The optical imaging lens group according to claim 1, wherein a radius of curvature R14 of an image-side surface of the seventh lens, a radius of curvature R15 of an object-side surface of the eighth lens and a radius of curvature R16 of an image-side surface of the eighth lens satisfy: 0.2<R14/(R16−R15)<1.0.

9. The optical imaging lens group according to claim 1, wherein a maximal effective radius DT21 of an object-side surface of the second lens and a maximal effective radius DT81 of an object-side surface of the eighth lens satisfy: 0.5<DT21/DT81<1.0.

10. The optical imaging lens group according to claim 1, wherein an edge thickness ET5 of the fifth lens and an edge thickness ET6 of the sixth lens satisfy: 0.3<ET6/ET5<0.8.

11. The optical imaging lens group according to claim 1, wherein a maximal effective radius DT32 of an image-side surface of the third lens and a maximal effective radius DT52 of an image-side surface of the fifth lens satisfy: 0.5<DT52/DT32<1.0.

12. The optical imaging lens group according to claim 1, wherein a center thickness CT2 of the second lens on the optical axis, a center thickness CT3 of the third lens on the optical axis, a center thickness CT4 of the fourth lens on the optical axis and a center thickness CT5 of the fifth lens on the optical axis satisfy: 1.3<(CT2+CT3)/(CT4+CT5)<2.0.

13. The optical imaging lens group according to claim 1, wherein a center thickness CT6 of the sixth lens on the optical axis, a center thickness CT7 of the seventh lens on the optical axis and a center thickness CT8 of the eighth lens on the optical axis satisfy: 0.3<CT7/(CT6−CT8)<0.8.

14. The optical imaging lens group according to claim 1, wherein the fifth lens has a negative refractive power.

15. The optical imaging lens group according to claim 1, wherein the eighth lens has a negative refractive power, an object-side surface of the eighth lens is a concave surface, and an image-side surface of the eighth lens is a convex surface at an area close to the optical axis in the Y-axis direction of the optical imaging lens group.

16. The optical imaging lens group according to claim 1, wherein a maximal field-of-view FOV of the optical imaging lens group in a direction of a bisector of an angle between the Y-axis direction and the X-axis direction satisfies: FOV>80°.

17. The optical imaging lens group according to claim 1, wherein the f-number Fnoy of the optical imaging lens group in the Y-axis direction and an f-number Fnox of the optical imaging lens group in the X-axis direction satisfy: Fnox/Fnoy≥1.1.

18. An optical imaging lens group, comprising, sequentially along an optical axis from an object side to an image side: a first lens, a second lens, a third lens, a fourth lens, a fifth lens, a sixth lens, a seventh lens and an eighth lens, wherein the first lens, the second lens, the third lens, the fourth lens, the fifth lens, the sixth lens, the seventh lens and the eighth lens have refractive powers, wherein at least one lens in the first lens to the eighth lens has a non-rotationally symmetric aspheric surface;

an effective focal length f3y of the third lens in a Y-axis direction of the optical imaging lens group and an effective focal length f3x of the third lens in an X-axis direction of the optical imaging lens group satisfy: 0.5<f3y/(f3y+f3x)<2.0; and an f-number Fnoy of the optical imaging lens group in the Y-axis direction satisfies: Fnoy<2.9.

19. The optical imaging lens group according to claim 18, wherein an f-number Fnox of the optical imaging lens group in the X-axis direction satisfies: Fnox<3.0.

* * * * *